US012811322B2

(12) United States Patent
Miura et al.

(10) Patent No.: US 12,811,322 B2
(45) Date of Patent: Nov. 24, 2026

(54) CONNECTOR TO BE CONNECTED TO A FLEXIBLE CONNECTION

(71) Applicant: J.S.T. MFG. CO., LTD., Tokyo (JP)

(72) Inventors: Kazuto Miura, Yokohama (JP); Daisuke Ito, Yokohama (JP)

(73) Assignee: J.S.T. MFG. CO., LTD., Tokyo (JP)

( * ) Notice: Subject to any disclaimer, the term of this patent is extended or adjusted under 35 U.S.C. 154(b) by 337 days.

(21) Appl. No.: 18/610,197

(22) Filed: Mar. 19, 2024

(65) Prior Publication Data

US 2024/0322469 A1 Sep. 26, 2024

(30) Foreign Application Priority Data

Mar. 20, 2023 (JP) ................................ 2023-044321

(51) Int. Cl.

*H01R 12/77* (2011.01)
*H01R 13/187* (2006.01)

(Continued)

(52) U.S. Cl.

CPC ......... *H01R 12/771* (2013.01); *H01R 13/187* (2013.01); *H01R 13/62* (2013.01); *H01R 12/79* (2013.01)

(58) Field of Classification Search

CPC ...... H01R 12/771; H01R 12/79; H01R 12/78; H01R 13/641; H01R 13/629

(Continued)

(56) References Cited

U.S. PATENT DOCUMENTS 6,338,648 B1 * 1/2002 Miura .................... H01R 12/79 439/495
6,796,831 B1 * 9/2004 Yasufuku ............ H05K 7/1431 439/325

(Continued)

FOREIGN PATENT DOCUMENTS

CN 110098521 A * 8/2019 .......... H01R 13/405
CN 110880651 A * 3/2020 ............ H01R 12/58

(Continued)

*Primary Examiner* — Marcus E Harcum

(74) *Attorney, Agent, or Firm* — Kratz, Quintos & Hanson, LLP

(57) ABSTRACT

A connector includes a housing that includes an insertion recess portion into which the connection member is insertable from an end of the connection member in an insertion direction, a contact, and an insertion-resistance-giving member to give insertion resistance to the connection member through a projection. The projection protrudes from a side opposite to a contact portion of the contact into the insertion recess portion at a position away from the contact portion in a direction opposite to the insertion direction. When the connection member is inserted into the insertion recess portion, the connection member moves through a predetermined distance in the insertion direction until the end of the connection member comes into contact with a halfway portion of an inclined portion of the contact after the projection completes a run-aground operation in which the projection runs aground on an outer surface of a reinforcement plate in the end of the connection member. Insertion resistance received by the connection member generates a maximum value during the run-aground operation during a period of time during which the end of the connection member moves to the insertion completion position from an insertion starting position.

10 Claims, 15 Drawing Sheets

(51) Int. Cl.
*H01R 13/62* (2006.01)
*H01R 12/79* (2011.01)

(58) Field of Classification Search
USPC .................................................. 439/492, 493
See application file for complete search history.

(56) References Cited

U.S. PATENT DOCUMENTS

| | | | | |
|---|---|---|---|---|
| 7,048,573 B2* | 5/2006 | Masaki | H01R 12/89 | 439/492 |
| 7,056,154 B2* | 6/2006 | Washino | H01R 12/721 | 439/630 |
| 7,083,455 B1* | 8/2006 | Miura | H01R 12/774 | 439/495 |
| 7,112,079 B2* | 9/2006 | Miura | H01R 12/88 | 439/495 |
| 7,275,948 B2* | 10/2007 | Miura | H01R 12/79 | 439/495 |
| 8,182,277 B2* | 5/2012 | Yokoo | H01R 12/88 | 439/495 |
| 9,876,297 B2* | 1/2018 | Takane | H01R 13/635 | |
| 10,141,689 B2* | 11/2018 | Tamaki | H01R 12/721 | |
| 11,646,519 B2* | 5/2023 | Yamaguchi | H01R 12/727 | 439/260 |
| 11,688,972 B2* | 6/2023 | Sato | H01R 13/6272 | 439/329 |
| 11,876,316 B2* | 1/2024 | Brown | H01R 12/771 | |
| 2003/0060072 A1* | 3/2003 | Miura | H01R 12/79 | 439/260 |
| 2008/0009180 A1* | 1/2008 | Ikuta | H01R 12/592 | 439/495 |
| 2014/0073155 A1* | 3/2014 | Kiyooka | H01R 13/62994 | 439/157 |
| 2015/0270632 A1* | 9/2015 | Takane | H01R 12/716 | 439/78 |
| 2017/0264028 A1* | 9/2017 | Mizusawa | H01R 4/5008 | |
| 2017/0373414 A1* | 12/2017 | Sunada | H01R 12/721 | |
| 2018/0219325 A1* | 8/2018 | Yamada | H01R 12/777 | |
| 2018/0248286 A1* | 8/2018 | Naemura | H01R 12/88 | |
| 2019/0013607 A1* | 1/2019 | Naemura | H01R 12/7076 | |
| 2024/0079808 A1* | 3/2024 | Chen | H01R 12/774 | |
| 2024/0113459 A1* | 4/2024 | Masaki | H01R 12/88 | |
| 2024/0297452 A1* | 9/2024 | Ashibu | H01R 13/04 | |
| 2025/0309574 A1* | 10/2025 | Lu | H01R 12/774 | |

FOREIGN PATENT DOCUMENTS

| | | | | |
|---|---|---|---|---|
| JP | H07335342 A * | 12/1995 | H01R 12/79 |
| JP | 2016178003 A * | 10/2016 | |
| JP | 6212935 B2 | 10/2017 | |
| JP | 2018078069 A * | 5/2018 | |
| KR | 101178022 B1 * | 8/2012 | H01R 12/707 |
| WO | WO-2018042793 A1 * | 3/2018 | H01R 13/6599 |

* cited by examiner

CONNECTOR TO BE CONNECTED TO A FLEXIBLE CONNECTION

CROSS REFERENCE TO RELATED APPLICATION

This application corresponds to Japanese Patent Application No. 2023-044321 filed with the Japan Patent Office on Mar. 20, 2023, the entire disclosure of which is incorporated herein by reference.

BACKGROUND OF THE INVENTION

Field of the Invention

The present invention relates to a connector.

Description of Related Arts

An electric connector described in Japanese Patent No. 6212935 includes a lock member attached to an insulative housing as an electric connector to which a signal transmission medium (connection member), such as FPC or FFC, is connected. When the signal transmission medium is inserted into the insulative housing, an engagement claw portion of the lock member is engaged with a notch recess portion (engagement positioning portion) of a reinforcement member of the signal transmission medium (connection member), and, as a result, the signal transmission medium is held at a normal position.

Additionally, when the signal transmission medium is disengaged from the insulative housing, an operator operates a release-operating portion formed integrally with the lock member, and releases the engagement of the engagement claw portion with the notch recess portion.

However, the notch recess portion is provided in the reinforcement member, and therefore the structure is complicated. Additionally, the operator is required to perform the work of operating the release-operating portion before disengaging the signal transmission medium (connection member) from the insulative housing, and the work is complex.

SUMMARY OF THE INVENTION

A preferred embodiment of the present invention provides a connector that is capable of restraining the occurrence of improper engagement of a connection member by a simple structure and that enables an easy operation when the connection member is extracted.

A preferred embodiment of the present invention provides a connector to be connected to a flexible connection member. The connection member includes an insulation portion extending in a longitudinal direction, a plurality of conductive portions that are exposed in a predetermined range from an end in the longitudinal direction of the connection member on one surface of the insulation portion, that extend in the longitudinal direction, and that are arranged in parallel with each other in a lateral direction, and a reinforcement plate that is fixed to one other surface of the insulation portion in a predetermined range from the end in the longitudinal direction of the connection member and that is a flat surface in a whole area of an outer surface of the reinforcement plate. The connector comprises a housing made of resin, a plurality of contacts, and an elastically deformable insertion-resistance-giving member. The housing includes an insertion recess portion into which the connection member is insertable from the end of the connection member in an insertion direction along the longitudinal direction. The insertion recess portion includes a strike portion to strike the end of the connection member at an insertion completion position of the end of the connection member. Each of the plurality of contacts includes an elastic segmental portion held by the housing. The elastic segmental portion includes an inclined portion that is inclined with respect to the insertion direction and a contact portion that is disposed at a top portion provided at an end portion in the insertion direction of the inclined portion and that is capable of coming into contact with a corresponding one of the conductive portions. The insertion-resistance-giving member includes a projection protruding from a side opposite to the contact portion into the insertion recess portion at a position away from the contact portion in a direction opposite to the insertion direction. The insertion-resistance-giving member is configured to give insertion resistance to the connection member through the projection. A position of the projection is set so that, when the connection member is inserted into the insertion recess portion, the connection member is movable through a predetermined distance in the insertion direction until the end of the connection member comes into contact with a halfway portion of the inclined portion of the contact after the projection completes a run-aground operation in which the projection runs aground on the outer surface of the reinforcement plate in the end of the connection member. The insertion resistance received by the connection member is configured to generate a maximum value during the run-aground operation during a period of time during which the end of the connection member moves to the insertion completion position from an insertion starting position at which the end of the connection member starts insertion into the insertion recess portion.

With this configuration, the connection member that has generated the maximum value during the run-aground operation briskly moves through a predetermined distance until the end comes into contact with the halfway portion of the inclined portion of the contact after the projection of the insertion-resistance-giving member runs aground on the reinforcement plate at the end. Inertia at this time enables the end of the connection member to run over the contact portion and to reliably reach the insertion completion position, and therefore it is possible to restrain the occurrence of improper engagement. Unlike the conventional technique, a reinforcing member (reinforcement plate) is not required to be hollowed, and the whole area of the outer surface of the reinforcement plate is a flat surface, and therefore the structure is simple. Additionally, unlike the conventional technique, a releasing operation is not required to be performed when the connection member is disengaged, and therefore the workability is excellent.

In a preferred embodiment, an entire interval from the insertion starting position to the insertion completion position through which the end of the connection member is movable includes an early-term insertion interval, a run-aground operation interval, a middle-term insertion interval, a run-over operation interval, and a late-term insertion interval. The early-term insertion interval is an interval from the insertion starting position to a first contact position at which an end of the reinforcement plate comes into contact with the projection. The run-aground operation interval is an interval from the first contact position to a run-aground-operation completion position at which the projection completes the run-aground operation. The middle-term insertion interval is an interval from the run-aground-operation completion position to a second contact position at which the end of the connection member comes into contact with the halfway portion of the inclined portion of the contact. The run-over operation interval is an interval from the second contact position to a run-over-operation completion position at which a run-over operation is completed in which the end runs over the contact portion. The late-term insertion interval is an interval from the run-over-operation completion position to the insertion completion position. The insertion resistance received by the connection member during a period of time during which the end of the connection member moves from the insertion starting position to the insertion completion position is configured to generate a first peak value that is the maximum value in the run-aground operation interval, and is configured to generate a second peak value that is lower than the first peak value in the run-over operation interval. The insertion resistance received by the connection member during a period of time during which the end of the connection member moves through the middle-term insertion interval is configured to become lower than the second peak value.

With this configuration, the end of the connection member that has moved through the run-aground operation interval generating the first peak value that is the maximum value briskly makes an inertial movement in a state in which the connection member receives insertion resistance lower than the second peak value, and runs over the contact portion by means of its inertia, and reliably reaches the insertion completion position. This makes it possible to restrain the occurrence of improper engagement.

In a preferred embodiment, an interval length of the early-term insertion interval is longer than an interval length of the run-aground operation interval. With this configuration, the connection member is inserted into the insertion recess portion with a sufficient length before the run-aground operation. Therefore, the insertion attitude of the connection member is stabilized during the run-aground operation.

In a preferred embodiment, a sum of an interval length of the run-aground operation interval, an interval length of the middle-term insertion interval, and an interval length of the run-over operation interval is equal to or less than an interval length of the late-term insertion interval. With this configuration, the connection member moves through a sufficient distance, and strikes the strike portion after the run-over operation, and therefore the operator can easily obtain a feeling that the connection member has been inserted in the far side of the insertion recess portion and that the inserting operation has been completed.

In one preferred embodiment of the present invention, an interval length of the early-term insertion interval is not less than 20% and not more than 60% of an interval length of the entire interval. With this configuration, the interval length of the early-term insertion interval is set to be 20% or more of the interval length of the total of the entire interval, and therefore the connection member is inserted into the insertion recess portion with a sufficient length before the run-aground operation. Therefore, the operator can pressurize the connection member in the insertion direction in a stable attitude, and the workability is excellent. Additionally, the interval length of the early-term insertion interval is set to be a value falling within a range of 60% or less of the interval length of the entire interval, and, as a result, this makes it possible to contribute to downsizing.

In a preferred embodiment, the insertion-resistance-giving member is a cantilevered resinous elastic arm that is formed integrally with the housing by a single member and whose front end has the projection. This configuration makes it possible to form a simple structure.

In a preferred embodiment, the resinous elastic arm includes a width center that is a center in the width direction. A position of the width center of the resinous elastic arm is configured to coincide with a position of a width center in the lateral direction of the connection member when the connection member is inserted into the insertion recess portion. A width of the resinous elastic arm is not less than 50% and not more than 70% of a width in the lateral direction of the connection member. The maximum value of the insertion resistance will become low if the width of the resinous elastic arm is less than 50% of the width of the connection member, and therefore sufficient inertia cannot be obtained. On the other hand, it will become difficult to insert the connection member if the width of the resinous elastic arm exceeds 70% of the width of the connection member. Therefore, if the width of the metallic elastic arm is set to be not less than 50% and not more than 70% of the width of the connection member, it is possible to satisfy both of sufficient inertia and easy insertion.

In a preferred embodiment, the insertion-resistance-giving member includes a metallic elastic arm held by the housing. With this configuration, the adjustment of an elastic force is facilitated.

In a preferred embodiment, the metallic elastic arm includes a metallic elastic arm provided as a component that is structurally independent of the plurality of contacts. With this configuration, the adjustment of an elastic force is facilitated.

In a preferred embodiment, the plurality of contacts include a contact formed integrally with the metallic elastic arm by a single member. This configuration makes it possible to form a simple structure.

DETAILED DESCRIPTION OF THE PREFERRED EMBODIMENT

Preferred embodiments in which the present invention has been embodied will be hereinafter described in accordance with the drawings.

Figure 1:
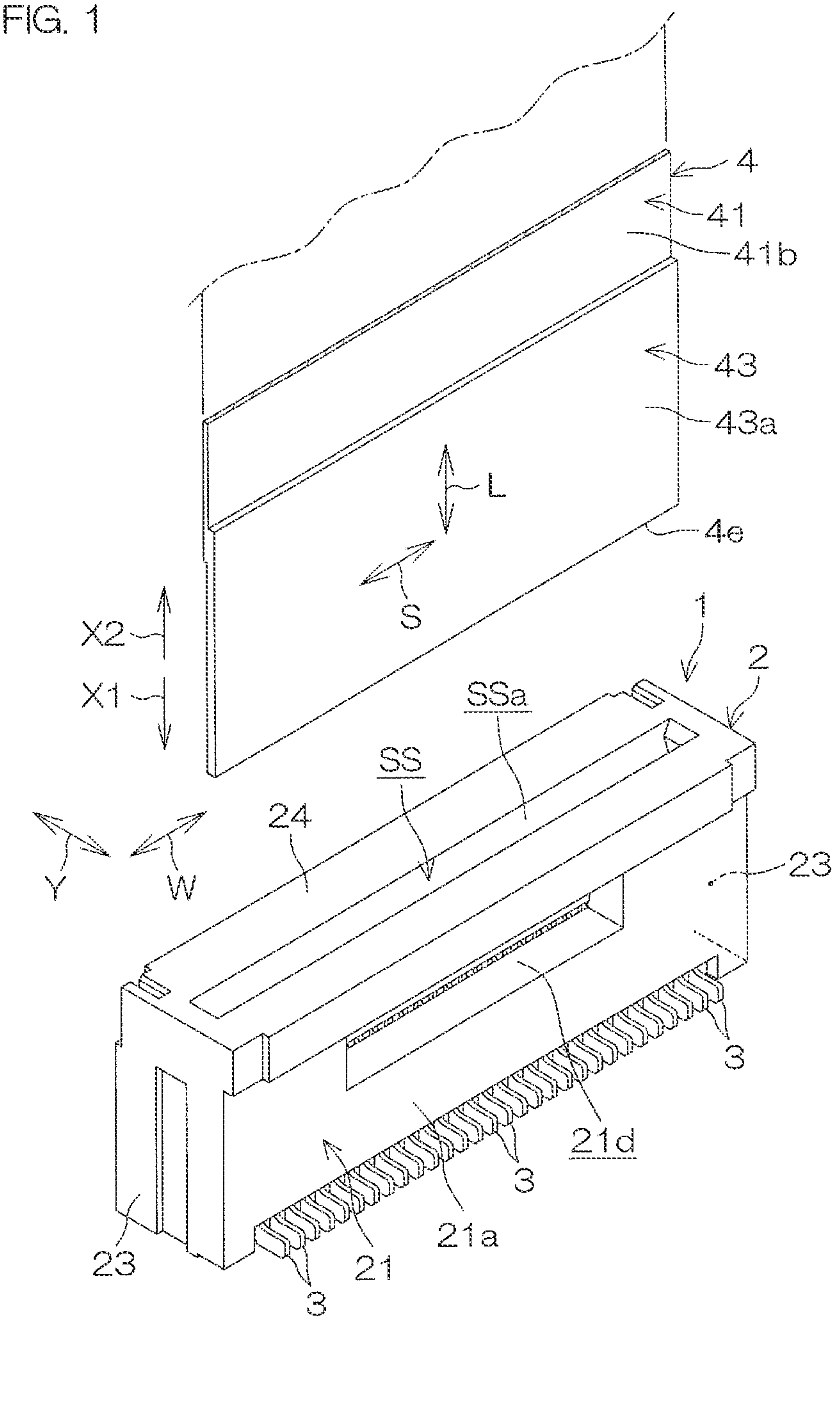
FIG. 1 is a perspective view of a connector and a connection member according to a first preferred embodiment of the present invention.
Figure 2:
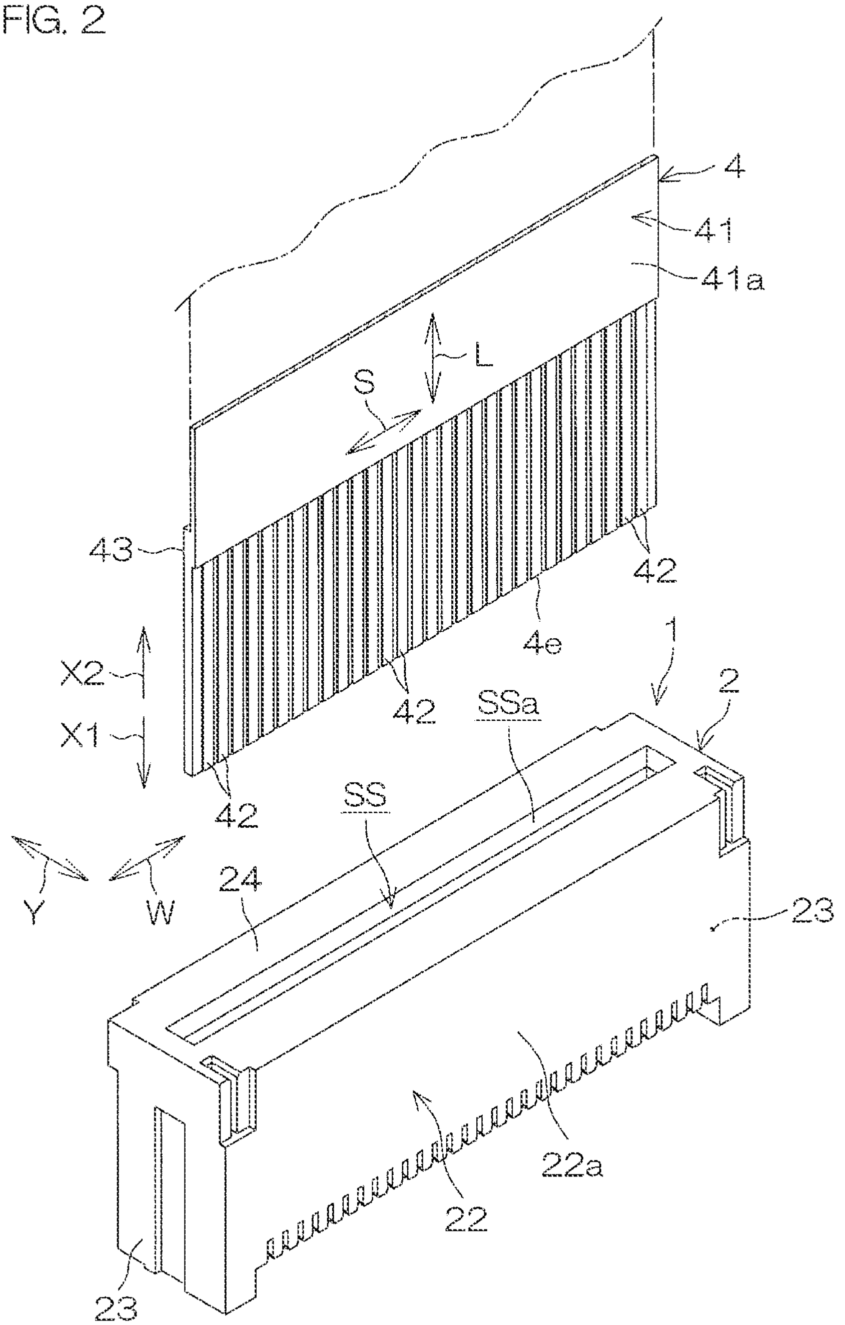
FIG. 2 is a perspective view of the connector and the connection member that are seen from another angle.

FIG. 1 is a perspective view of a connector and a connection member according to a first preferred embodiment of the present invention. FIG. 2 is a perspective view of the connector and the connection member that are seen from another angle. The connector 1 includes a synthetic-resin housing 2, a plurality of contacts 3, and an insertion-resistance-giving member RA (see FIG. 8A) as shown in FIG. 1 and FIG. 2. A flexible flat connection member 4 is connected to the connector 1.

The connection member 4 is a flexible flat connection member, such as FFC (Flexible Flat Cable) or FPC (Flexible Printed Circuit). In this preferred embodiment, a description is given on the basis of a case in which the connection member 4 is the FFC.

Figure 3A:
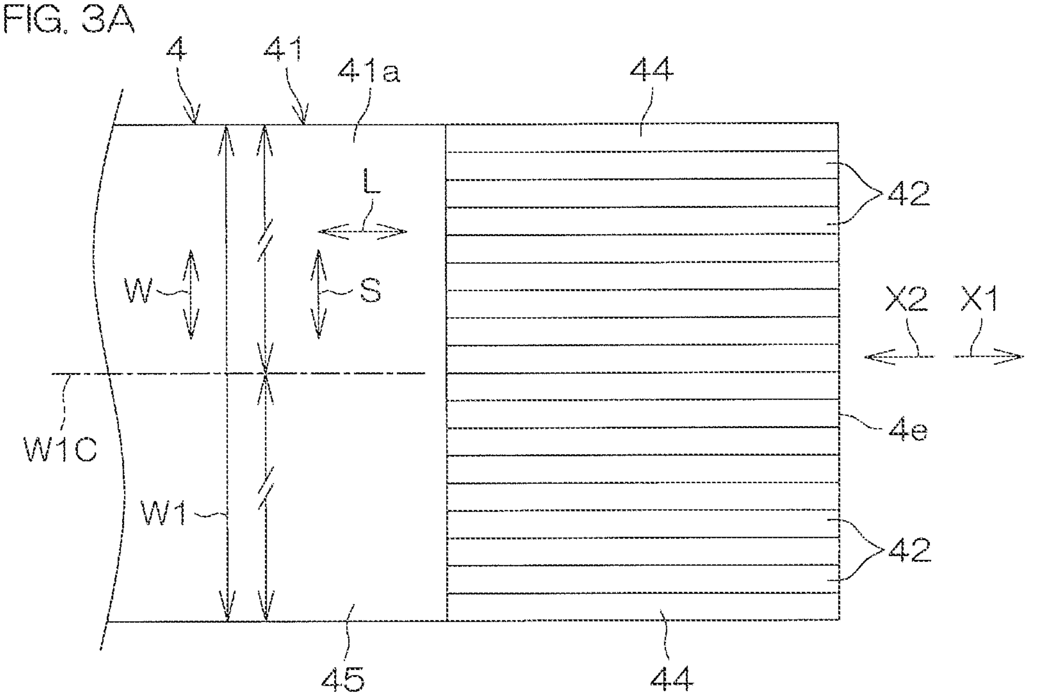
FIG. 3A and FIG. 3B are a plan view and a side view, respectively, of the connection member.
Figure 3B:
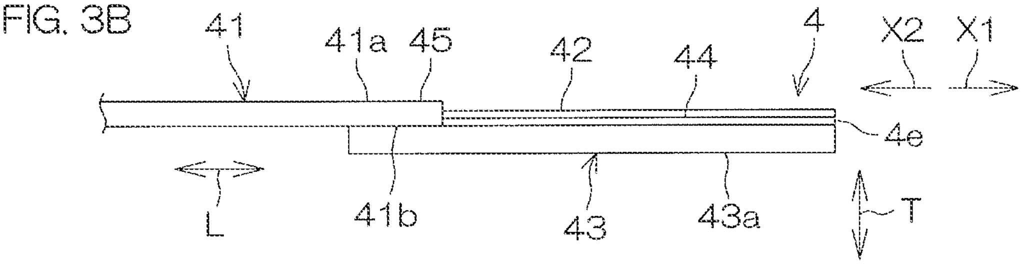

FIG. 3A and FIG. 3B are a plan view and a side view, respectively, of the connection member 4. The connection member 4 includes an insulation portion 41 extending in a longitudinal direction L, a plurality of conductive portions 42 extending in the longitudinal direction L, and a reinforcement plate 43 as shown in FIG. 3A and FIG. 3B. The plurality of conductive portions 42 are disposed in parallel with each other at a distance from each other in a lateral direction S. The insulation portion 41 includes abase portion 44 and a cover portion 45 that are stacked together in a thickness direction T of the connection member 4. The cover portion 45 covers the base portion 44 and each of the conductive portions 42 so as to expose each of the conductive portions 42 from an end 4*e* in the longitudinal direction L of the connection member 4 in a predetermined range. Each of the conductive portions 42 is partially exposed toward one surface 41*a* of the insulation portion 41.

The reinforcement plate 43 is disposed on the side opposite to the cover portion 45 with respect to the base portion 44. The reinforcement plate 43 is fixedly stacked on the base portion 44 (the other surface 41*b* of the insulation portion 41) in a predetermined range from one end 4*e* in the longitudinal direction L of the connection member 4. The whole area of an outer surface 43*a* of the reinforcement plate

43 is a flat surface. The reinforcement plate 43 is made of synthetic resin. However, the reinforcement plate 43 may be made of metal.

Next, the housing 2 will be described.

Figure 4:
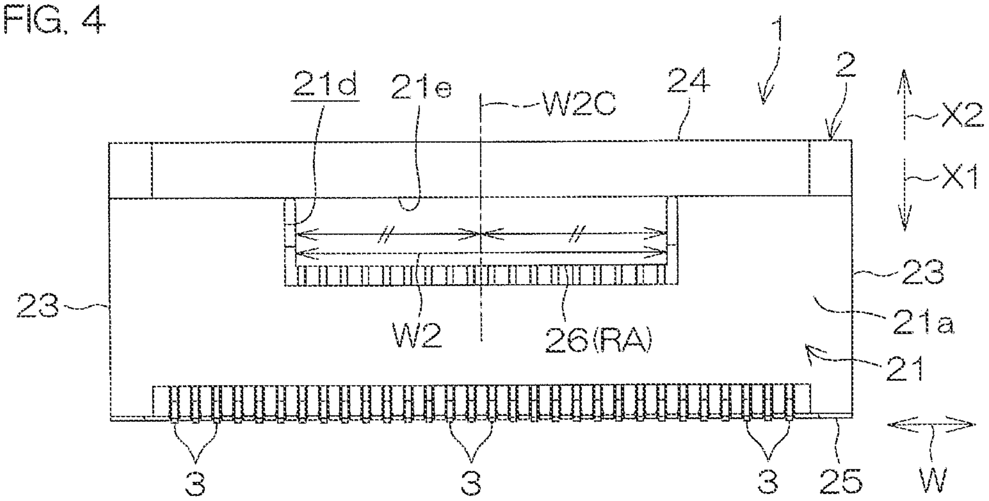
FIG. 4 is a front view of the connector.
Figure 5:
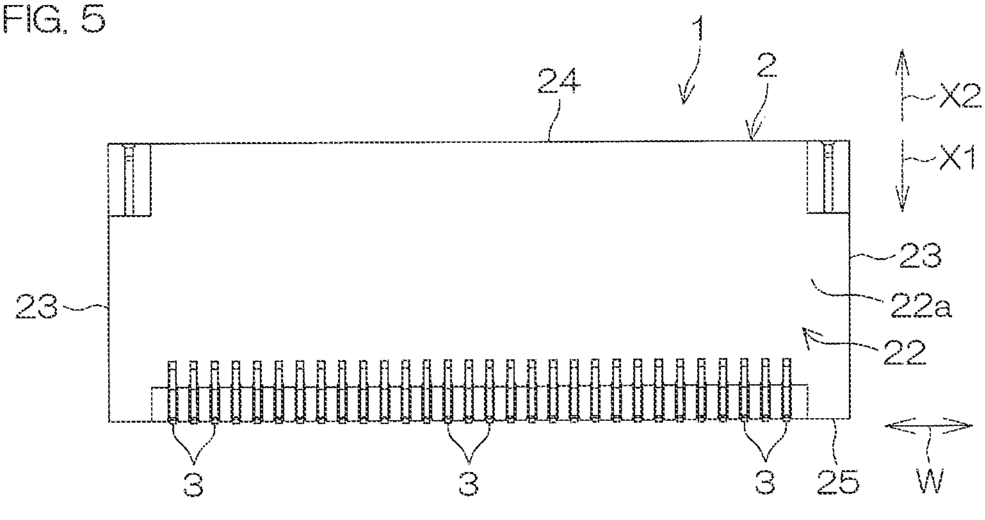
FIG. 5 is a rear view of the connector.
Figure 6:
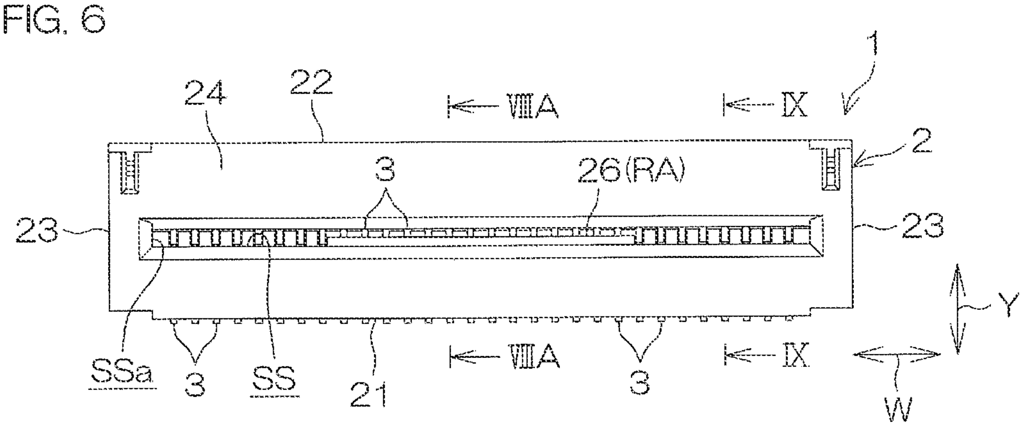
FIG. 6 is a plan view of the connector.
Figure 7:
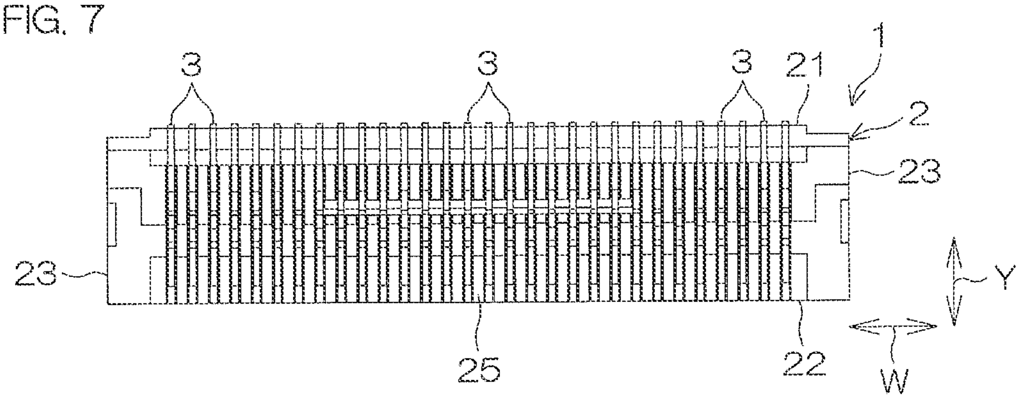
FIG. 7 is a bottom view of the connector.
Figure 8A:
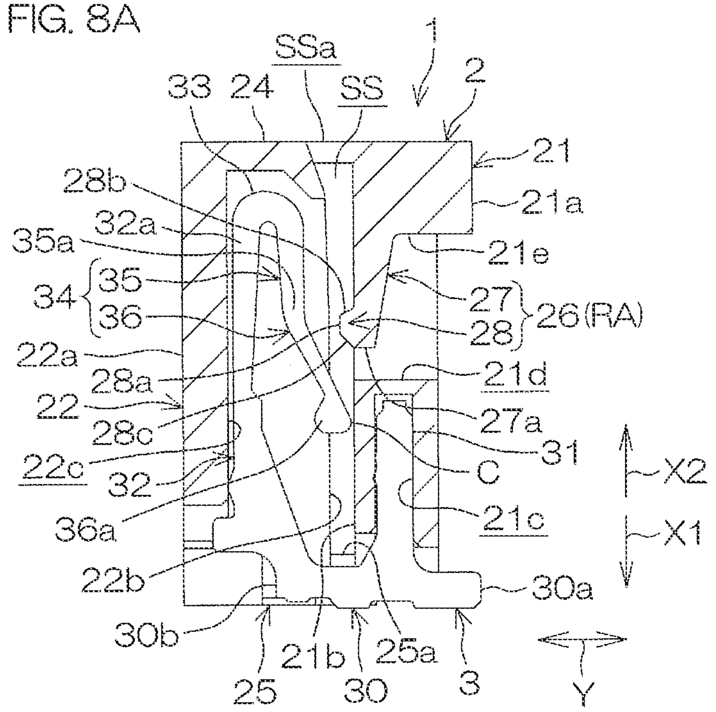
FIG. 8A is a cross-sectional view of the connector, and corresponds to a cross-sectional view along line VIIIA-VIIIA of FIG. 6.
Figure 8B:
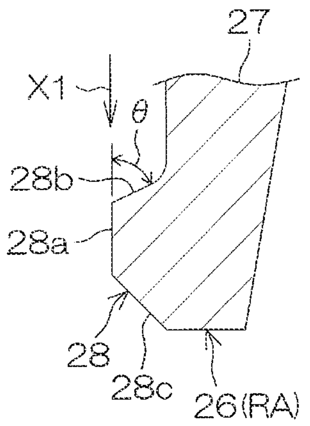
FIG. 8B is an enlarged view of a projection of a resinous elastic arm.
Figure 9:
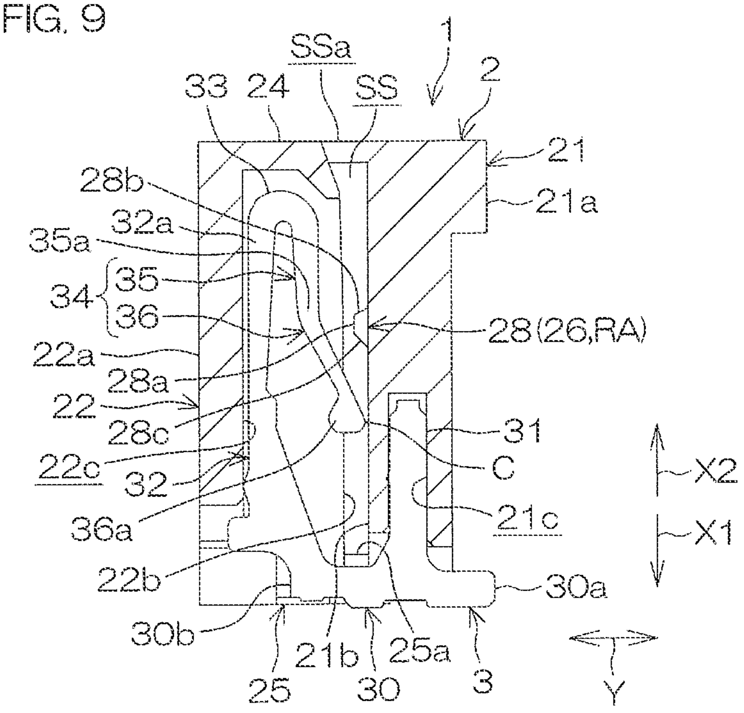
FIG. 9 is a cross-sectional view of the connector, and corresponds to a cross-sectional view along line IX-IX of FIG. 6.

FIG. 4 is a front view of the connector 1. FIG. 5 is a rear view of the connector 1. FIG. 6 is a plan view of the connector 1. FIG. 7 is a bottom view of the connector 1. FIG. 8A corresponds to a cross-sectional view along line VIIIA-VIIIA of FIG. 6. FIG. 8B is a partially enlarged view of FIG. 8A. FIG. 9 is a cross-sectional view along line IX-IX of FIG. 6.

The housing 2 includes a front wall 21, a rear wall 22, a pair of sidewalls 23, an upper wall 24, a lower wall 25, an insertion recess portion SS, and a resinous elastic arm 26 that is a constituent of the insertion-resistance-giving member RA (see FIG. 8A) as shown in FIG. 1 and FIG. 2. The insertion recess portion SS is an internal space of the housing 2 surrounded by the front wall 21, the rear wall 22, and the pair of sidewalls 23 between the upper wall 24 and the lower wall 25 as shown in FIG. 8A.

Figure 10:
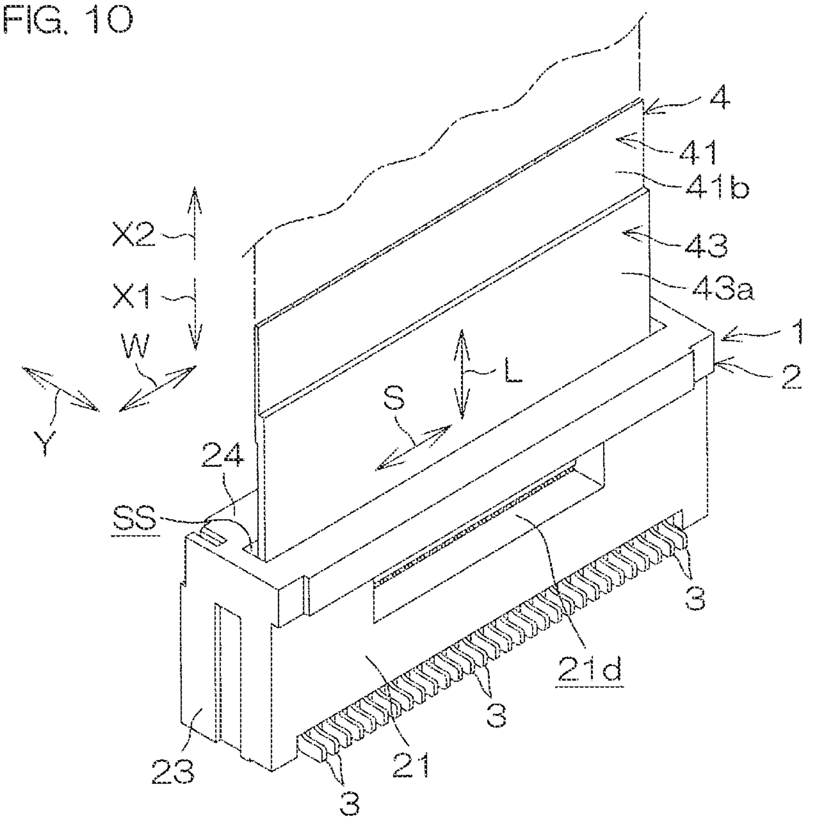
FIG. 10 is a perspective view of the connector when an early-term insertion of the connection member is completed.
Figure 11:
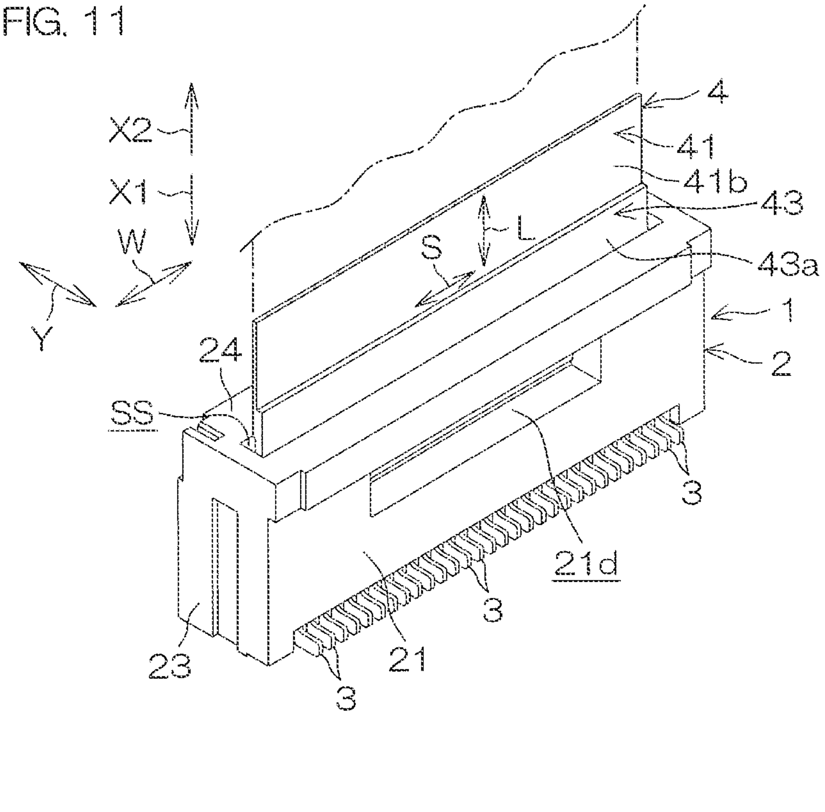
FIG. 11 is a perspective view of the connector when an insertion of the connection member is completed.

The connection member 4 is inserted into the insertion recess portion SS in an insertion direction X1 along the longitudinal direction L from the end-4*e* side as shown in FIG. 1, FIG. 10, and FIG. 11. Therefore, the insertion recess portion SS is open toward an upward side (in a direction X2 opposite to the insertion direction X1) in a rectangular insertion opening SSa formed in the upper wall 24 as shown in FIG. 6 and FIG. 8A. A strike portion 25*a* that is an inner upper surface of the lower wall 25 is provided on the bottom of the insertion recess portion SS as shown in FIG. 8A. Two directions that are perpendicular to each other and that are perpendicular to the insertion direction X1 will be hereinafter referred to as a front-rear direction Y and a width direction W, respectively. The width direction W is a direction along the lateral direction S of the connection member 4 when being inserted.

The front wall 21 includes an outer surface 21*a* that is a front surface, an inner surface 21*b* that faces the insertion recess portion SS, a contact press-fitting groove 21*c*, and a rectangular opening hole 21*d* as shown in FIG. 8A. The contact press-fitting groove 21*c* extends in the insertion direction X1, and is open toward the downward side (in the insertion direction X1). The opening hole 21*d* passes through the front wall 21 in the front-rear direction Y as shown in FIG. 4 and FIG. 8A. A resinous elastic arm 26 is formed in the opening hole 21*d*.

The resinous elastic arm 26 includes a rectangular planar arm body 27 that is extended in a cantilever manner from an upper edge portion 21*e* of the opening hole 21*d* toward the downward side (in the insertion direction X1) and a projection 28 provided at an extensional end 27*a* of the arm body 27 as shown in FIG. 8A.

The resinous elastic arm 26 includes a width center W2C that is a center in the width direction W as shown in FIG. 4. The position of the width center W2C of the resinous elastic arm 26 is configured to coincide with the position of a width center W1C in the lateral direction S of the connection member 4 when the connection member 4 is inserted into the insertion recess portion SS. A width W2 of the resinous elastic arm 26 is not less than 50% and not more than 70% of a width W1 in the lateral direction S of the connection member 4. In other words, the relation of $0.5\times W1 \leq W2 \leq 0.7\times W1$ is established.

The projection 28 includes a top portion 28*a*, a first inclined portion 28*b* disposed in the opposite direction X2, which is opposite to the insertion direction X1, from the top portion 28*a*, and a second inclined portion 28*c* disposed in the insertion direction X1 from the top portion 28*a* as shown in FIG. 8A. At least one part of the projection 28 advances into the insertion recess portion SS while the resinous elastic arm 26 is in a free state. The first inclined portion 28*b* and the second inclined portion 28*c* are inclined in mutually opposite directions with respect to the insertion direction X1. The first inclined portion 28*b* is inclined so as to approach the contact-portion-C side in the insertion direction X1.

Preferably, when the resinous elastic arm 26 is in a free state, the inclination angle θ of the first inclined portion 28*b* with the insertion direction X1 is in a range of not less than 60 degrees and less than 90 degrees (60 degrees≤θ<90 degrees) as shown in FIG. 8B, and, more preferably, in a range of not less than 70 degrees and less than 90 degrees (70 degrees≤θ<90 degrees), and, even more preferably, in a range of not less than 80 degrees and less than 90 degrees (80 degrees≤θ<90 degrees). The reason is that, when the connection member 4 is inserted, the feeling that the end 4*e* of the connection member 4 has stricken the projection 28 is enabled to be more strongly given to the operator in proportion to an approach to 90 degrees in the inclination angle θ of the first inclined portion 28*b*.

The rear wall 22 includes an outer surface 22*a* (see FIG. 5) that is a rear surface, an inner surface 22*b* that faces the insertion recess portion SS, and a plurality of contact holding grooves 22*c* as shown in FIG. 8A. The contact holding groove 22*c* is formed in the inner surface 22*b* of the rear wall 22, and extends in the insertion direction X1, and is open toward the downward side (in the insertion direction X1).

Next, the contact 3 will be described.

The contact 3 includes a base 30, a first fixed segmental portion 31, a second fixed segmental portion 32, a curved turnup portion 33, an elastic segmental portion 34, and a contact portion C as shown in FIG. 8A. The base 30 is a constituent of a lead extending in the front-rear direction Y, and is soldered to a conductive portion on a surface of a circuit board (not shown). The base 30 includes a front end 30*a* and a rear end 30*b*. The first fixed segmental portion 31 is orthogonally extended from an intermediate portion of the base 30 toward the upward side (in the opposite direction X2 that is opposite to the insertion direction X1). The first fixed segmental portion 31 is pressed and fixed into the contact press-fitting groove 21*c* of the front wall 21 of the housing 2.

The second fixed segmental portion 32 is orthogonally extended from the rear end 30*b* of the base 30 toward the upward side. The elastic segmental portion 34 is a cantilevered segmental portion turned up from an extensional end 32*a* of the second fixed segmental portion 32 through the turnup portion 33. The second fixed segmental portion 32 is inserted into and is held by the contact holding groove 22*c* of the rear wall 22 of the housing 2.

The elastic segmental portion 34 includes an insertion-direction extensional portion 35, an inclined portion 36, and the contact portion C. The insertion-direction extensional portion 35 extends along the insertion direction X1 from the turnup portion 33. The inclined portion 36 is inclinedly extended from an extensional end 35*a* of the insertion-direction extensional portion 35 toward the insertion direction X1 so as to approach the front wall 21. The contact portion C is disposed at a top portion 36*a* placed at an end on the insertion side of the inclined portion 36. The contact portion C and a halfway portion of the inclined portion 36 adjacent to the contact portion C are disposed inside the insertion recess portion SS while the elastic segmental portion 34 is in a free state.

Next, the operation of connecting the connection member 4 to the connector 1 will be described.

FIG. 10 is a perspective view of the connector 1 when an early-term insertion of the connection member 4 is completed. FIG. 11 is a perspective view of the connector 1 when the connection member 4 reaches an insertion completion position. FIGS. 12A to 12F are cross-sectional views of the connector 1 that successively show insertion steps of the connection member 4. In each of FIGS. 12A to 12F, the cross section of the connection member 4 is shown schematically with single hatching for simplicity. FIG. 13 is a graph showing a relationship between an insertion position (abscissa axis) of the end 4*e* of the connection member 4 and insertion resistance (ordinate axis) given to the connection member 4.

Figure 12A:
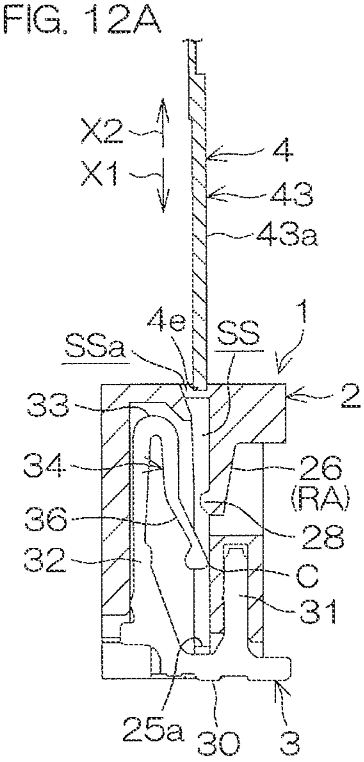
FIGS. 12A to 12F are schematic cross-sectional views of the connector that successively show insertion steps of the connection member.
Figure 13:
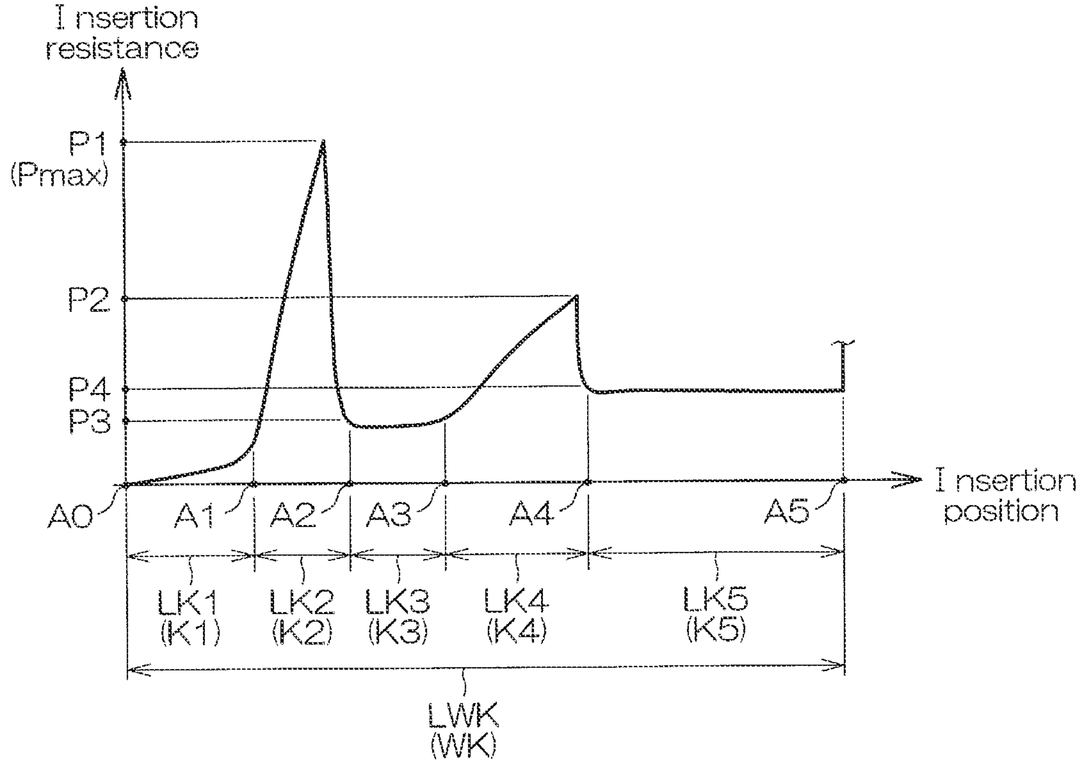
FIG. 13 is a graph showing a relationship between an insertion position of an end of the connection member and insertion resistance given to the connection member.

The connection member 4 is inserted into the insertion recess portion SS from the end 4*e* through the insertion opening SSa as shown in FIG. 12A. The insertion position of the connection member 4 is represented on the basis of the position in the insertion direction X1 of the end 4*e* of the connection member 4. The position of the end 4*e* of the connection member 4 when the end 4*e* of the connection member 4 is placed at the insertion opening SSa is an insertion starting position A0 (see FIG. 12A).

An interval (which corresponds to an entire interval WK) from the insertion starting position (see FIG. 12A) to the insertion completion position (see FIG. 12F), in which the end 4*e* of the connection member 4 is movable, includes an early-term insertion interval K1, a run-aground operation interval K2, a middle-term insertion interval K3, a run-over operation interval K4, and a late-term insertion interval K5 as shown in FIG. 13.

Figure 12B:
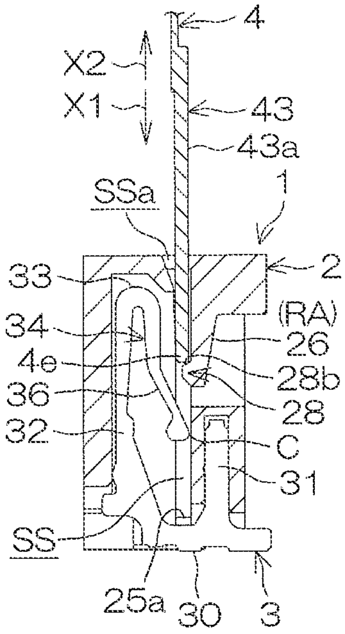

The early-term insertion interval K1 is an interval in which the end 4*e* of the connection member 4 moves from the insertion starting position A0 (see FIG. 12A) until the end 4*e* reaches a first contact position A1 (see FIG. 12B). The first contact position A1 is a position of the end 4*e* of the connection member 4 when one end of the reinforcement plate 43 (the end 4*e* of the connection member 4) comes into contact with the first inclined portion 28*b* of the projection 28 of the resinous elastic arm 26.

Figure 12C:
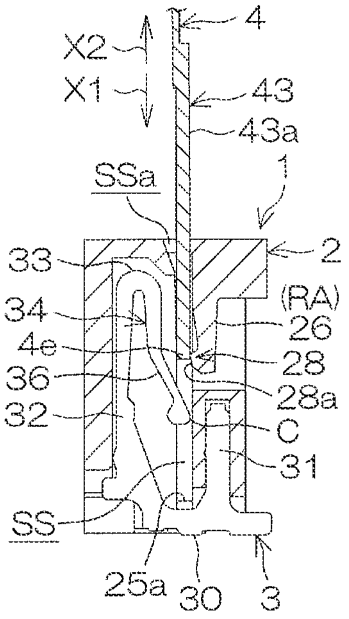

The run-aground operation interval K2 is an interval in which the end 4*e* of the connection member 4 moves from the first contact position A1 (see FIG. 12B) until the end 4*e* reaches a run-aground-operation completion position A2 (see FIG. 12C). The run-aground-operation completion position A2 is a position of the end 4*e* of the connection member 4 when a run-aground operation is completed in which the top portion 28*a* of the projection 28 runs aground on the outer surface 43*a* in the end of the reinforcement plate 43 (the end 4*e* of the connection member 4).

Figure 12D:
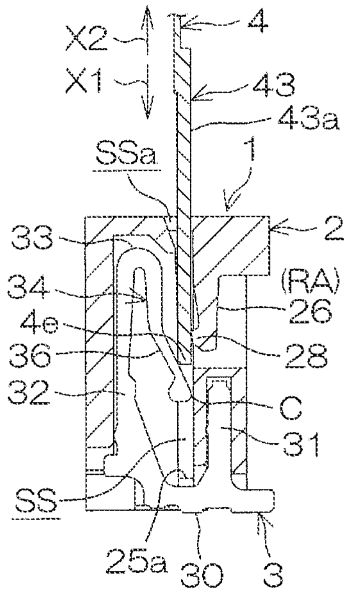

The middle-term insertion interval K3 is an interval in which the end 4*e* of the connection member 4 moves from the run-aground-operation completion position A2 (see FIG. 12C) until the end 4*e* reaches a second contact position A3 (see FIG. 12D). The second contact position A3 is a position of the end 4*e* of the connection member 4 when the end 4*e* of the connection member 4 comes into contact with the halfway portion of the inclined portion 36 of the contact 3.

Figure 12E:
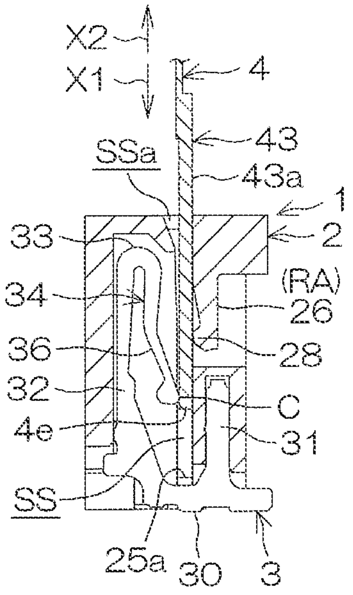

The run-over operation interval K4 is an interval in which the end 4*e* of the connection member 4 moves from the second contact position A3 (see FIG. 12D) until the end 4*e* reaches a run-over-operation completion position A4 (see FIG. 12E). The run-over-operation completion position A4 is a position of the end 4*e* of the connection member 4 when the run-over operation is completed in which the end 4*e* of the connection member 4 runs over the contact portion C.

Figure 12F:
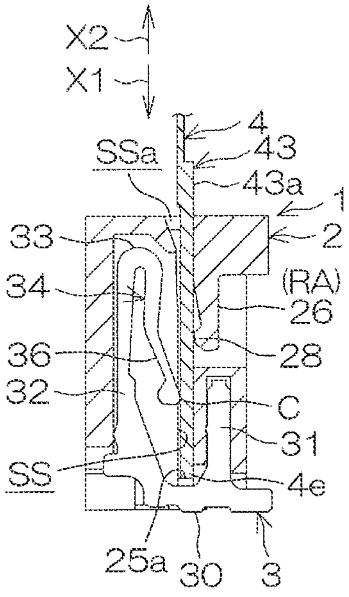

The late-term insertion interval K5 is an interval in which the end 4*e* of the connection member 4 moves from the run-over-operation completion position A4 (see FIG. 12E) until the end 4*e* reaches an insertion completion position A5 (see FIG. 12F). The insertion completion position A5 is a position of the end 4*e* of the connection member 4 when the end 4*e* of the connection member 4 strikes the strike portion 25*a* of the bottom of the insertion recess portion SS.

Insertion resistance received by the connection member 4 during the movement of the end 4*e* of the connection member 4 from the insertion starting position A0 to the insertion completion position A5 is configured to generate a first peak value P1 that is a maximum value Pmax of the insertion resistance in the entire interval WK in the run-aground operation interval K2 as shown in FIG. 13. Additionally, the insertion resistance is configured to generate a second peak value P2 lower than the first peak value P1 (P2<P1) in the run-over operation interval K4.

A maximum value P3 of the insertion resistance received by the connection member 4 during the movement of the end 4*e* of the connection member 4 in the middle-term insertion interval K3 is configured to become lower than the second peak value P2. A maximum value P4 of the insertion resistance received by the connection member 4 during the movement of the end 4*e* of the connection member 4 in the late-term insertion interval K5 is configured to become lower than the second peak value P2. The maximum value P3 of the insertion resistance received by the connection member 4 during the movement of the end 4*e* of the connection member 4 in the middle-term insertion interval K3 is configured to become lower than the second maximum value P4 of the insertion resistance received by the connection member 4 during the movement of the end 4*e* of the connection member 4 in the late-term insertion interval K5.

An interval length LK1 of the early-term insertion interval K1 is set to be longer than an interval length LK2 of the run-aground operation interval K2. In other words, the relation of LK1>LK2 is established.

The sum of the interval length LK2 of the run-aground operation interval K2, an interval length LK3 of the middle-term insertion interval K3, and an interval length LK4 of the run-over operation interval K4 is set to be equal to or less than an interval length LK5 of the late-term insertion interval K5. In other words, the relation of LK2+LK3+LK4=LK5 or the relation of LK2+LK3+LK4≤LK5 is established.

The interval length LK1 of the early-term insertion interval K1 is not less than 20% and not more than 60% of an interval length LWK that is a total of the entire interval WK from the insertion starting position A0 to the insertion completion position A5. In other words, the relation of 0.2×LWK≤LK1≤0.6×LWK is established.

According to this preferred embodiment, the maximum value Pmax (first peak value P1) of the insertion resistance in the entire interval WK is generated when the projection 28 of the resinous elastic arm 26 (insertion-resistance-giving member RA) runs aground on the reinforcement plate 43 of the end 4*e* of the connection member 4 (see FIG. 12B and FIG. 12C) as shown in FIG. 13. After the projection 28 completes the run-aground operation of running aground on the reinforcement plate 43, the end 4*e* of the connection member 4 briskly moves through a predetermined distance until the end 4*e* comes into contact with the halfway portion of the inclined portion 36 of the contact 3 (see FIG. 12C and FIG. 12D). Inertia at this time enables the end 4*e* of the connection member 4 to run over the contact portion C of the contact 3 (see FIG. 12E) and to reliably reach the insertion completion position A5 (see FIG. 12F), and therefore it is possible to restrain the occurrence of improper engagement. Unlike the conventional technique, a reinforcing member (reinforcement plate) is not required to be hollowed, and the whole area of the outer surface 43*a* of the reinforcement plate 43 is a flat surface, and therefore the structure is simple. Additionally, unlike the conventional technique, a releasing operation is not required to be performed when the connection member 4 is disengaged, and therefore the workability is excellent.

Additionally, as shown in FIG. 13, the insertion resistance received by the connection member 4 during the movement of the end 4*e* of the connection member 4 from the insertion starting position A0 to the insertion completion position A5 is configured to generate the first peak value P1 that is the maximum value Pmax in the run-aground operation interval K2, and is configured to generate the second peak value P2 lower than the first peak value P1 in the run-over operation interval K4. With this configuration, the end 4*e* of the connection member 4 that has moved through the run-aground operation interval K2 generating the first peak value P1 that is the maximum value Pmax briskly makes an inertial movement in the middle-term insertion interval K3 in a state in which the connection member 4 receives the insertion resistance lower than the second peak value P2, and runs over the contact portion C of the contact 3 by its inertia, and reliably reaches the insertion completion position A5. This makes it possible to restrain the occurrence of improper engagement.

Additionally, the interval length LK1 of the early-term insertion interval K1 is longer than the interval length LK2 of the run-aground operation interval K2 (LK1>LK2). With this configuration, the connection member 4 is inserted into the insertion recess portion SS with a sufficient length before the run-aground operation (see FIG. 12B). Therefore, the insertion attitude of the connection member 4 is stabilized during the run-aground operation.

Additionally, the sum of the interval length LK2 of the run-aground operation interval K2, the interval length LK3 of the middle-term insertion interval K3, and the interval length LK4 of the run-over operation interval K4 is set to be equal to the interval length LK5 of the late-term insertion interval K5 (LK2+LK3+LK4=LK5) or to be equal to or less than the interval length LK5 of the late-term insertion interval K5 (LK2+LK3+LK4≤LK5). With this configuration, the connection member 4 moves through a sufficient distance, and strikes the strike portion 25*a* after the run-over operation (see FIG. 12E and FIG. 12F), and therefore the operator can easily obtain a feeling that the connection member 4 has been inserted in the far side of the insertion recess portion SS and that the inserting operation has been completed.

Additionally, the interval length LK1 of the early-term insertion interval K1 is not less than 20% and not more than 60% of the interval length LWK of the total of the entire interval WK from the insertion starting position A0 to the insertion completion position A5 (0.2×LWK≤LK1≤0.6×LWK). With this configuration, the interval length LK1 of the early-term insertion interval K1 is 20% or more of the interval length LWK of the total of the entire interval WK, and therefore the connection member 4 will have been inserted in the insertion recess portion SS with a sufficient length before the run-aground operation. Therefore, the operator can pressurize the connection member 4 in the insertion direction X1 in a stable attitude, and the workability is excellent. Additionally, the interval length LK1 of the early-term insertion interval K1 is set to be a value falling within a range of 60% or less of the interval length LWK of the total of the entire interval WK, and, as a result, this makes it possible to contribute to downsizing.

Additionally, the insertion-resistance-giving member RA includes the cantilevered resinous elastic arm 26 that is formed integrally with the housing 2 by a single member as shown in FIG. 8A. This configuration makes it possible to form a simple structure.

Additionally, the position of the width center 2C of the resinous elastic arm 26 (see FIG. 4) is configured to coincide with the position of the width center W1C (see FIG. 3A) in the lateral direction S of the connection member 4 when the connection member 4 is inserted into the insertion recess portion SS. The width W2 of the resinous elastic arm 26 is set to be not less than 50% and not more than 70% of the width W1 in the lateral direction S of the connection member 4 ($0.5 \times W1 \leq W2 \leq 0.7 \times W1$). The maximum value of the insertion resistance will become low if the width W2 of the resinous elastic arm 26 is less than 50% of the width W1 of the connection member 4, and therefore it is impossible to obtain sufficient inertia. On the other hand, it will become difficult to insert the connection member 4 if the width W2 of the resinous elastic arm 26 exceeds 70% of the width W1 of the connection member 4. Therefore, the width W2 of the resinous elastic arm 26 is set to be a value falling within a range of not less than 50% and not more than 70% of the width W1 of the connection member, and, as a result, it is possible to satisfy both of sufficient inertia and easy insertion.

Next, a second preferred embodiment of the present invention will be described.

Figure 14:
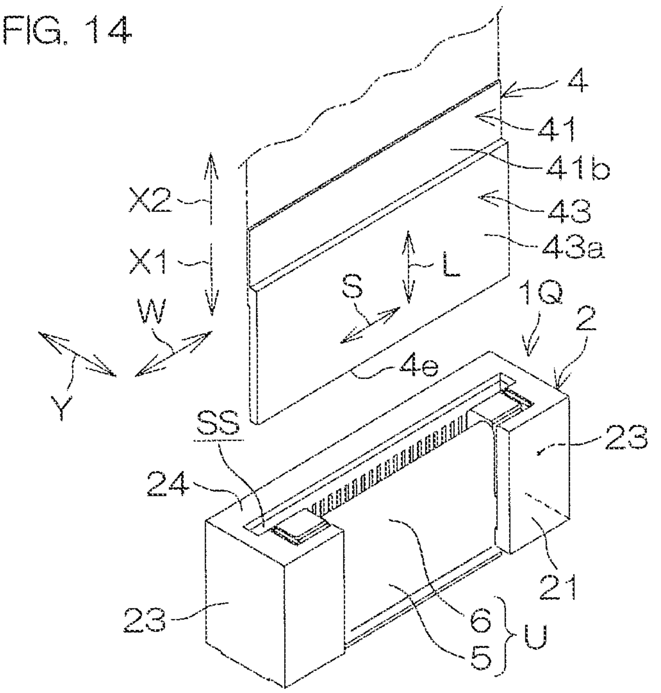
FIG. 14 is a perspective view of a connector and a connection member according to a second preferred embodiment of the present invention.
Figure 15:
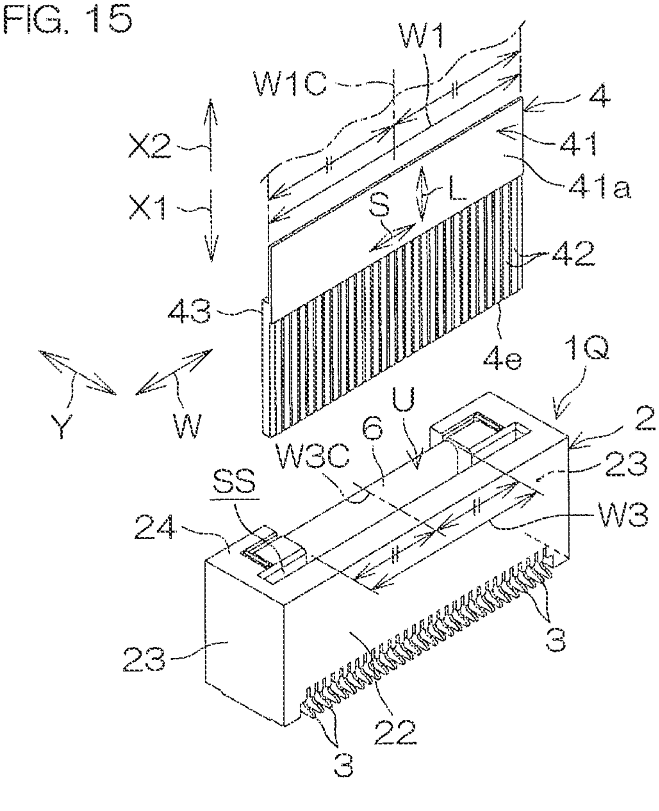
FIG. 15 is a perspective view of the connector and the connection member that are seen from another angle.
Figure 16:
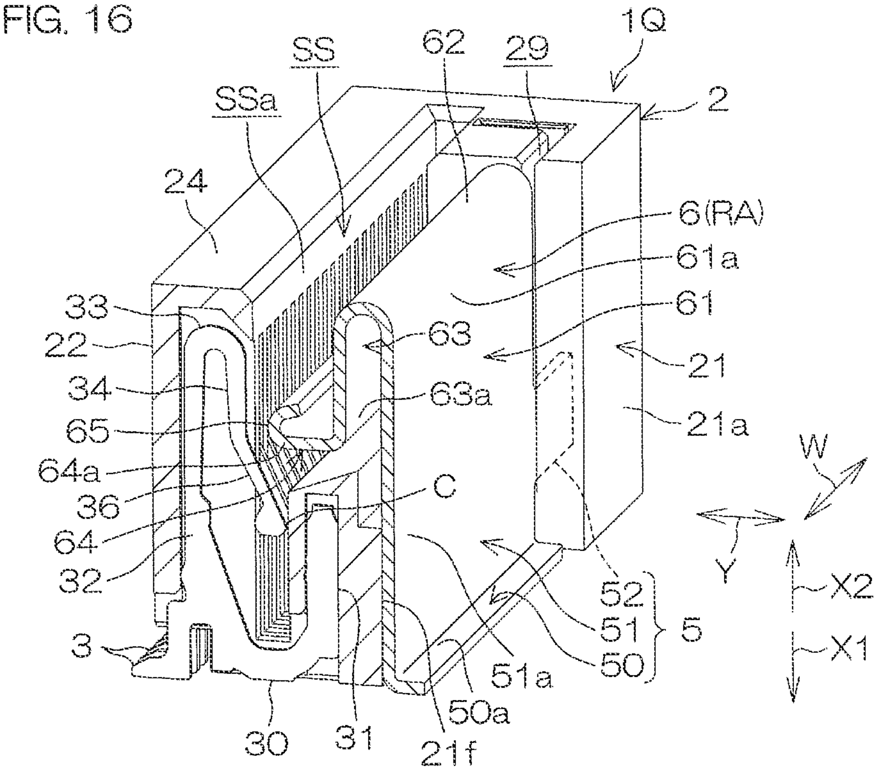
FIG. 16 is a partially cross-sectional perspective view of the connector.
Figure 17:
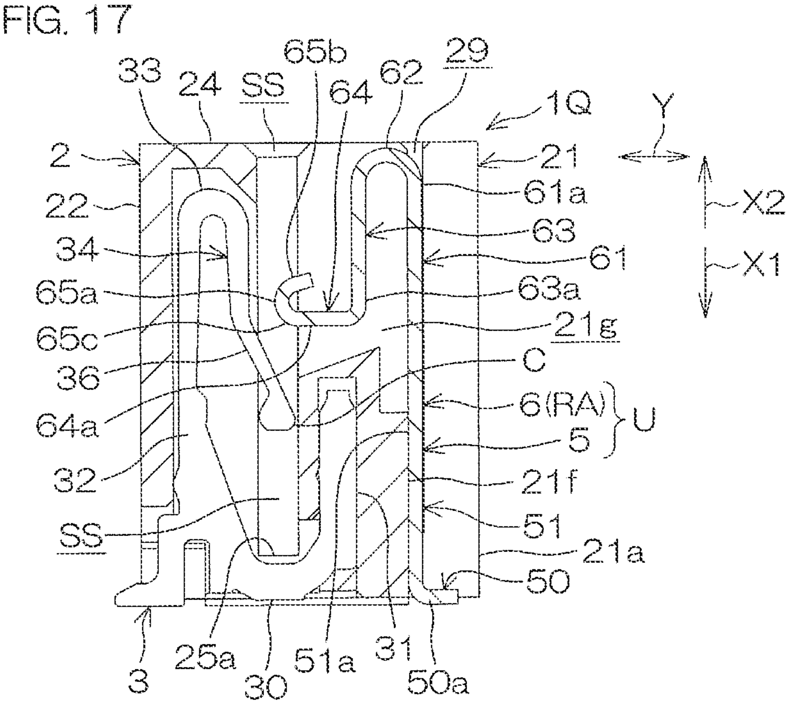
FIG. 17 is a cross-sectional view of the connector.

FIG. 14 is a perspective view of a connector 1Q and the connection member 4 according to the second preferred embodiment of the present invention. FIG. 15 is a perspective view of the connector 1Q and the connection member 4 that are seen from another angle. FIG. 16 is a partially cross-sectional perspective view of the connector 1Q. FIG. 17 is a cross-sectional view of the connector 1Q. FIGS. 18A to 18F are cross-sectional views of the connector 1Q that successively show insertion steps of the connection member 4.

The connector 1Q of the second preferred embodiment chiefly differs from the connector 1 of the first preferred embodiment as follows. In detail, in the connector 1Q, the front wall 21 of the housing 2 includes a recess portion 21*f* disposed at a lower portion of the central portion in the width direction W of the outer surface 21*a* and an open portion 21*g* disposed at a higher position than the recess portion 21*f* as shown in FIG. 16 and FIG. 17. Additionally, in a pair of side portions, the housing 2 includes a tab fixing groove 29 that extends in the opposite direction X2 opposite to the insertion direction X1 and that is open in the opposite direction X2 (in FIG. 16, only the tab fixing groove 29 that is one of the pair of side portions is shown). The connector 1Q includes a metallic arm unit U that is integrally formed by a single metallic plate. The metallic arm unit U includes a plate-shaped metallic fixed arm 5 and a plate-shaped metallic elastic arm 6 that provides the insertion-resistance-giving member RA.

The metallic fixed arm 5 includes a base 50, a main plate portion 51, and a pair of tabs 52 (in FIG. 16, only one of the pair of tabs 52 is shown). The base 50 is soldered and fixed to a conductive portion (not shown) of a circuit board. The main plate portion 51 extends in the opposite direction X2 opposite to the insertion direction X1 orthogonally from a rear end 50*a* of the base 50. The main plate portion 51 is along the recess portion 21*f* provided on the outer surface 21*a* of the front wall 21. The pair of tabs 52 are disposed in the insertion direction X1 from an extensional end 51*a* of the main plate portion 51, and extend outwardly from the pair of side edges of the main plate portion 51. Each of the tabs 52 is pressed and fixed to the tab fixing groove 29 provided at both side portions of the housing 2.

The metallic elastic arm 6 includes a first portion 61, a second portion 62, a third portion 63, a fourth portion 64, and a projection 65. The first portion 61 is a plate portion that continuously extends from the extensional end 51*a* of the main plate portion 51 in the opposite direction X2 opposite to the insertion direction X1. The first portion 61 is disposed in the opposite direction X2 opposite to the insertion direction X1 from the pair of tabs 52 of the metallic fixed arm 5. The first portion 61 is bendable in the front-rear direction Y with the extensional end 51*a* of the main plate portion 51 serving as a fulcrum. The first portion 61 also fulfills a function as a cover that covers the open portion 21*g* as shown in FIG. 16.

The second portion 62 is a plate portion that forms a curved turnup portion as shown in FIG. 16 and FIG. 17. The third portion 63 is a plate portion that is turned from an extensional end 61*a* of the first portion 61 through the curved second portion 62 and that extends in the insertion direction X1. In the metallic elastic arm 6 being in a free state, the first portion 61 and the third portion 63 are in parallel with each other. Additionally, the length of the first portion 61 is set to be longer than the length of the third portion 63.

The fourth portion 64 is a plate portion that is orthogonally extended rearwardly from an extensional end 63*a* of the third portion 63 as shown in FIG. 17. The projection 65 is a curved plate-shaped projection that is connected to an extensional end 64*a* of the fourth portion 64. The projection 65 includes a top portion 65*a*, a first inclined portion 65*b* disposed in the opposite direction X2 opposite to the insertion direction X1 from the top portion 65*a*, and a second inclined portion 65*c* disposed in the insertion direction X1 from the top portion 65*a*. At least one part of the projection 65 advances into the insertion recess portion SS while the metallic elastic arm 6 is in a free state. The first inclined portion 65*b* and the second inclined portion 65*c* are inclined in mutually opposite directions with respect to the insertion direction X1. The first inclined portion 65*b* is inclined so as to approach the contact-portion-C side toward the insertion direction X1.

The metallic elastic arm 6 includes a width center W3C that is a center in the width direction W as shown in FIG. 15. The position of the width center W3C of the metallic elastic arm 6 is configured to coincide with the position of the width center W1C in the lateral direction S of the connection member 4 when the connection member 4 is inserted into the insertion recess portion SS. Preferably, a width W3 of the metallic elastic arm 6 is not less than 50% and not more than 70% of the width W1 in the lateral direction S of the connection member 4 ($0.5 \times W1 \leq W3 \leq 0.7 \times W1$). The maximum value of the insertion resistance will become low if the width W3 of the metallic elastic arm 6 is less than 50% of the width W1 of the connection member 4, and therefore sufficient inertia cannot be obtained. On the other hand, it will become difficult to insert the connection member 4 if the width W3 of the metallic elastic arm 6 exceeds 70% of the width W1 of the connection member 4. Therefore, if the width W3 of the metallic elastic arm 6 is set to be not less than 50% and not more than 70% of the width W1 of the connection member 4, it is possible to satisfy both of sufficient inertia and easy insertion.

Figure 18A:
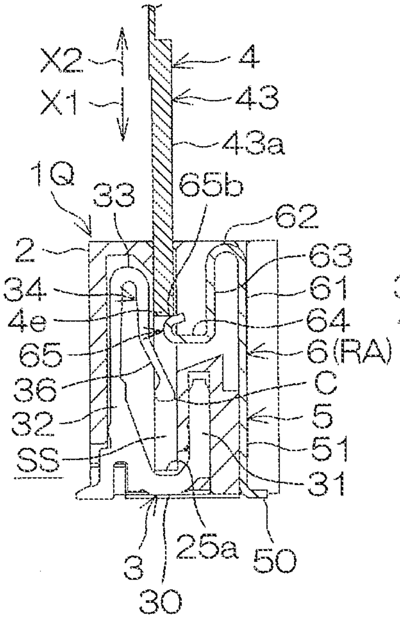
FIGS. 18A to 18F are schematic cross-sectional views of the connector that successively show insertion steps of the connection member.

FIGS. 18A to 18F are cross-sectional views of the connector 1Q that successively show insertion steps of the connection member 4. In each of FIGS. 18A to 18F, the cross section of the connection member 4 is shown schematically with single hatching for simplicity. FIG. 18A shows a state in which the end 4*e* of the connection member 4 is placed at the first contact position at which the end 4*e* comes into contact with the first inclined portion 65*b* of the projection 65.

Figure 18B:
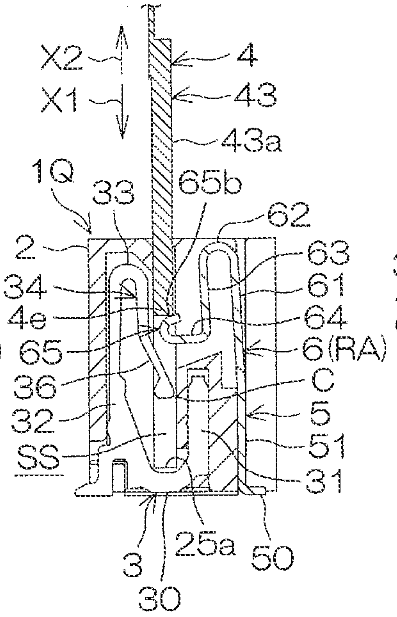
Figure 18C:
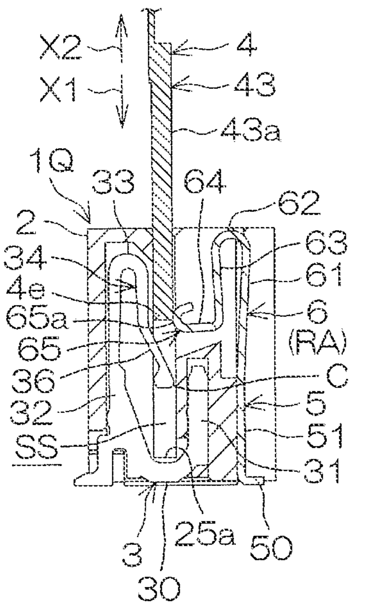

FIG. 18B shows a state in which the end 4*e* of the connection member 4 that has moved from the first contact position in the insertion direction X1 by a slight amount depresses the projection 65 in the insertion direction X1 through the first inclined portion 65*b* by a slight amount, and, as a result, the first portion 61 has been elastically bent rearwardly. FIG. 18C shows a state in which the end 4*e* of the connection member 4 is placed at the run-aground-operation completion position at which the run-aground operation is completed in which the projection 65 runs aground on the reinforcement plate 43 in the end 4*e* of the connection member 4. At this time, the first portion 61 of the metallic elastic arm 6 is elastically bent forwardly, and, simultaneously, the second portion 62 is elastically deformed so as to reduce the curvature radius of curving. The first portion 61 is temporarily bent rearwardly and is then bent forwardly as shown in FIG. 18B and FIG. 18C, and therefore it is possible to enlarge the value of the insertion resistance when the projection 65 runs aground on the reinforcement plate 43 (i.e., which correspond to the first peak value P1 in FIG. 13).

Figure 18D:
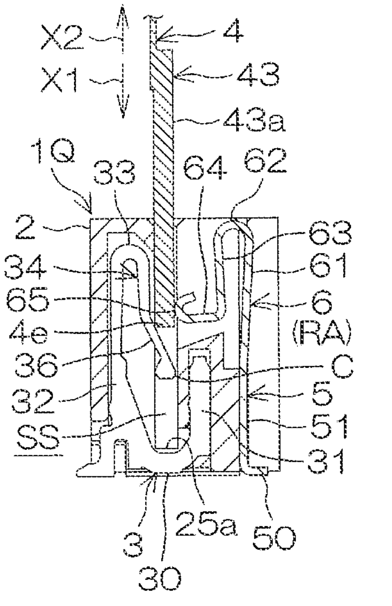
Figure 18E:
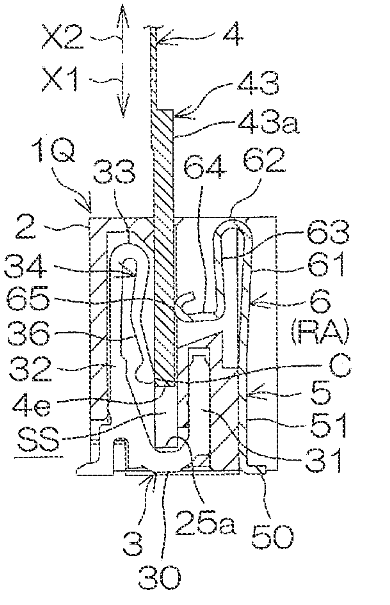
Figure 18F:
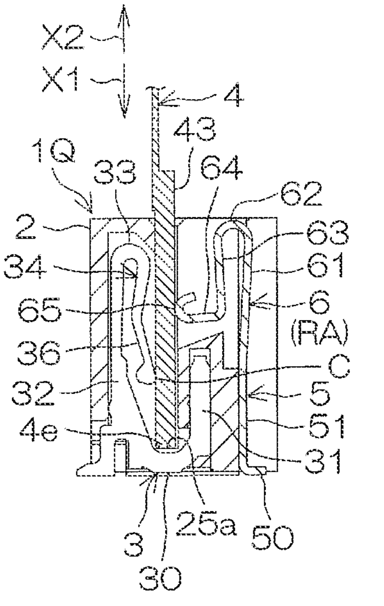

FIG. 18D shows a state in which the end 4*e* of the connection member 4 is placed at the second contact position at which the end 4*e* comes into contact with the halfway portion of the inclined portion 36. FIG. 18E shows a state in which the end 4*e* of the connection member 4 is placed at the run-over-operation completion position at which the run-over operation is completed in which the end 4*e* runs over the contact portion C. FIG. 18F shows a state in which the end 4*e* of the connection member 4 is placed at the insertion completion position. The relationship between the insertion position of one end of the connection member and the insertion resistance in the second preferred embodiment makes the same change as in FIG. 13 of the first preferred embodiment (not shown).

In this preferred embodiment, the same operational effect as in the first preferred embodiment is likewise fulfilled. Additionally, the use of the metallic elastic arm 6 facilitates the adjustment of an elastic force that determines the insertion resistance. The adjustment of an elastic force may be made not only by adjusting the width W3 of the metallic elastic arm 6 as described above but also by adjusting the plate thickness of the metallic elastic arm 6.

Next, a third preferred embodiment of the present invention will be described.

Figure 19:
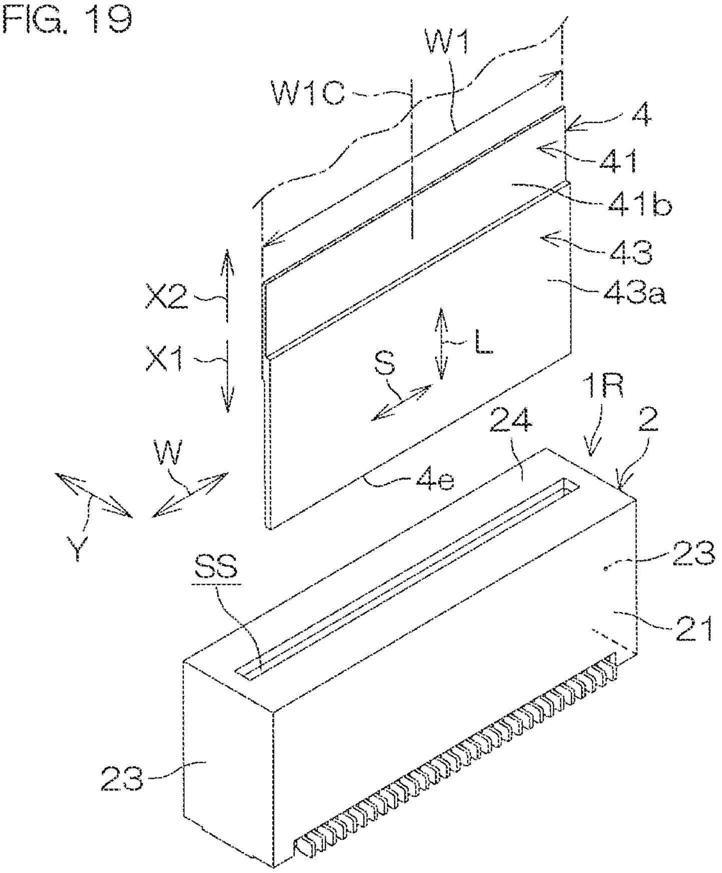
FIG. 19 is a perspective view of a connector and a connection member according to a third preferred embodiment of the present invention.
Figure 20:
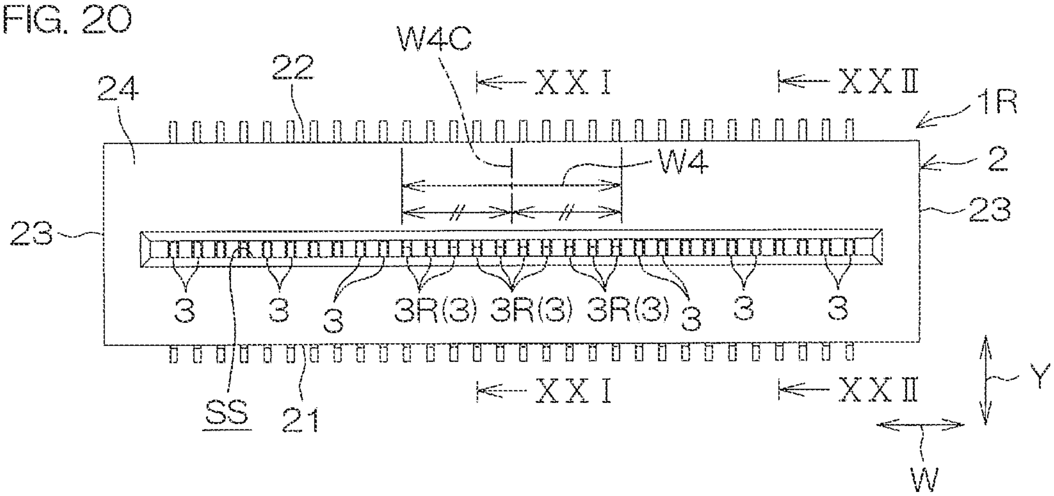
FIG. 20 is a plan view of the connector.
Figure 21:
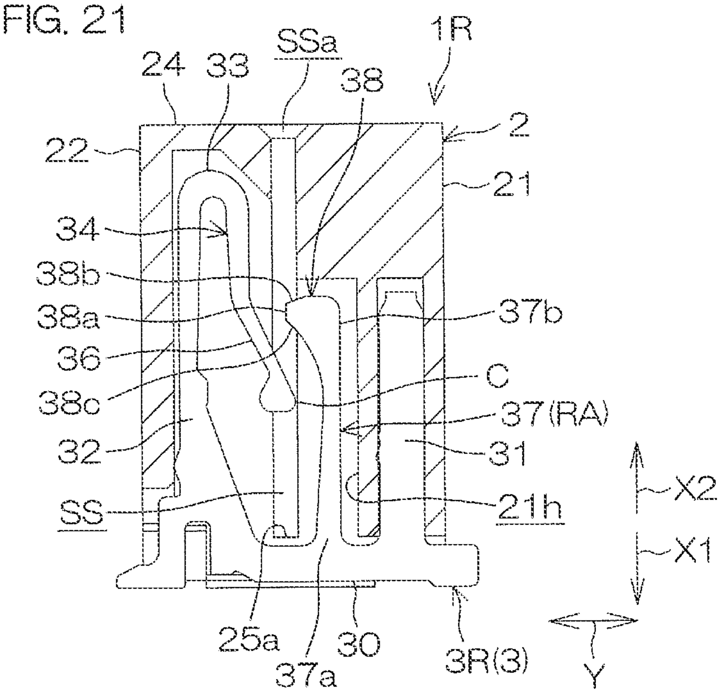
FIG. 21 is a cross-sectional view of the connector, and corresponds to a cross-sectional view along line XXI-XXI of FIG. 20.
Figure 22:
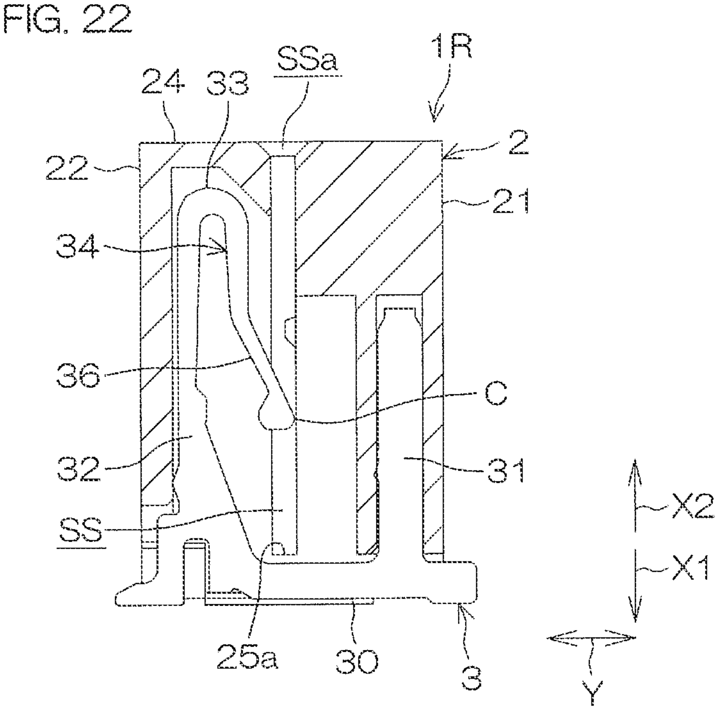
FIG. 22 is a cross-sectional view of the connector, and corresponds to a cross-sectional view along line XXII-XXII of FIG. 20.

FIG. 19 is a perspective view of a connector 1R and the connection member 4 according to the third preferred embodiment of the present invention. FIG. 20 is a plan view of the connector 1R. FIG. 21 is a cross-sectional view of the connector 1R, and corresponds to a cross-sectional view along line XXI-XXI of FIG. 20. FIG. 22 is a cross-sectional view of the connector 1R, and corresponds to a cross-sectional view along line XXII-XXII of FIG. 20. FIGS. 23A to 23F are cross-sectional views of the connector 1R that successively show insertion steps of the connection member 4.

The connector 1R of the third preferred embodiment chiefly differs from the connector 1 of the first preferred embodiment as follows. In detail, in the connector 1R of the third preferred embodiment, as shown in FIG. 20, a plurality of contacts 3R of at least one part among all the contacts 3 integrally form a metallic elastic arm 37, which serves as an insertion-resistance-giving member RA, by a single member as shown in FIG. 21. Remaining contacts 3 excluding the contact 3R are not provided with the metallic elastic arm 37 as shown in FIG. 22.

The metallic elastic arm 37 is orthogonally extended from the base 30 to the upward side (in the opposite direction X2) in the contact 3R as shown in FIG. 21. The front wall 21 of the housing 2 includes a metallic-elastic-arm housing groove 21*h* that houses the metallic elastic arm 37 and that is open to the insertion recess portion SS. The metallic elastic arm 37 includes a base end 37*a* connected to the base 30, an extensional end 37*b*, and a projection 38 provided at the extensional end 37*b*.

The projection 38 includes a top portion 38*a*, a first inclined portion 38*b* disposed in the opposite direction X2 opposite to the insertion direction X1 from the top portion 38*a*, and a second inclined portion 38*c* disposed in the insertion direction X1 from the top portion 38*a*. At least one part of the projection 38 advances into the insertion recess portion SS while the metallic elastic arm 37 is in a free state. The first inclined portion 38*b* and the second inclined portion 38*c* are inclined in mutually opposite directions with respect to the insertion direction X1. The first inclined portion 38*b* is inclined so as to approach the contact-portion-C side toward the insertion direction X1.

With respect to the width direction W, the position of a width center W4C of a disposition width W4 of the plurality of contacts 3R at which the metallic elastic arm 37 (see FIG. 21) is provided is configured to coincide with the position of the width center W1C (see FIG. 19) of the width in the lateral direction S (which corresponds to the width direction W) of the connection member 4 when the connection member 4 is inserted into the insertion recess portion SS as shown in FIG. 20. Preferably, the ratio of the number of poles of the contacts 3R each of which includes the metallic elastic arm 37 to the number of poles of all contacts 3 falls within a range of, for example, 30% to 70%. However, the contacts 3R each of which includes the metallic elastic arm 37 may be distributed in the whole area in the width direction W such that the contacts 3R are disposed in a distributed manner of one by one or two by two.

Figure 23A:
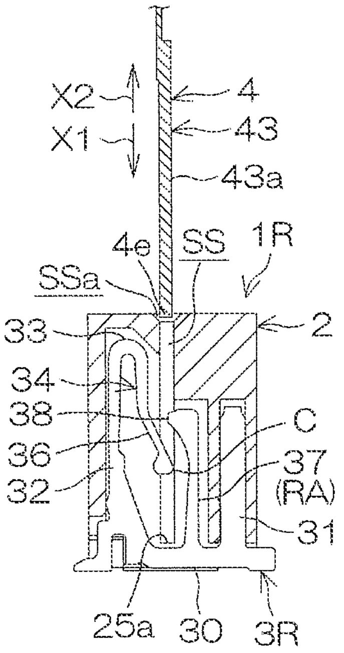
FIGS. 23A to 23F are schematic cross-sectional views of the connector that successively show insertion steps of the connection member.
Figure 23B:
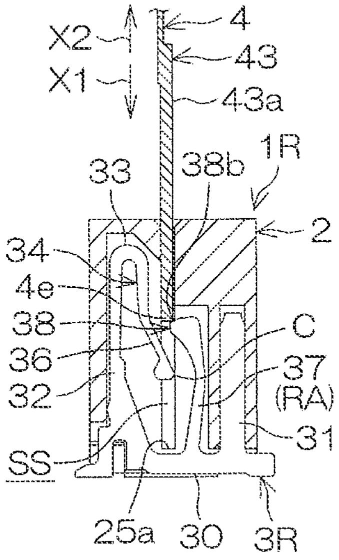
Figure 23C:
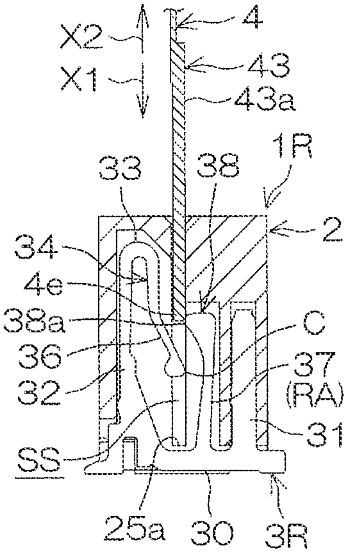

FIGS. 23A to 23F are cross-sectional views of the connector 1R that successively show insertion steps of the connection member 4. In each of FIGS. 23A to 23F, the cross section of the connection member 4 is shown schematically with single hatching for simplicity. FIG. 23A shows a state in which the end 4*e* of the connection member 4 is placed at the insertion starting position. FIG. 23B shows a state in which the end 4*e* of the connection member 4 is placed at the first contact position at which the end 4*e* comes into contact with the first inclined portion 38*b* of the projection 38. FIG. 23C shows a state in which the end 4*e* of the connection member 4 is placed at the run-aground-operation completion position at which the run-aground operation is completed in which the projection 38 runs aground on the reinforcement plate 43 in the end 4*e* of the connection member 4.

Figure 23D:
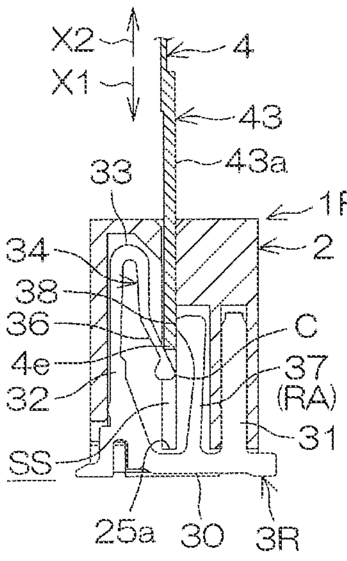
Figure 23E:
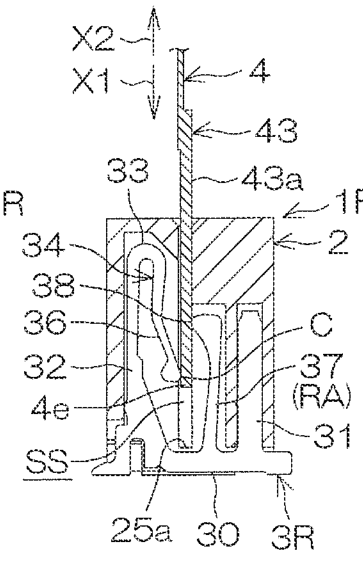
Figure 23F:
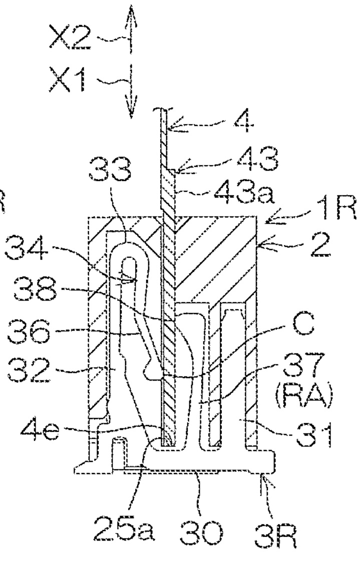

FIG. 23D shows a state in which the end 4*e* of the connection member 4 is placed at the second contact position at which the end 4*e* comes into contact with the halfway portion of the inclined portion 36. FIG. 23E shows a state in which the end 4*e* of the connection member 4 is placed at the run-over-operation completion position at which the run-over operation is completed in which the end 4*e* runs over the contact portion C. FIG. 23F shows a state in which the end 4*e* of the connection member 4 is placed at the insertion completion position. The relationship between the insertion position of one end of the connection member and the insertion resistance in the third preferred embodiment makes the same change as in FIG. 13 of the first preferred embodiment (not shown).

In this preferred embodiment, the same operational effect as in the first preferred embodiment is likewise fulfilled. Additionally, at least one part of the contacts 3R integrally forms the metallic elastic arm 37 that provides the insertion-resistance-giving member RA by a single member, and therefore it is possible to simplify the structure. Additionally, the adjustment of an elastic force that determines the insertion resistance is facilitated by adjusting the ratio of the number of poles of the contacts 3R each of which includes the metallic elastic arm 37 to the number of poles of all contacts 3.

The present invention is not limited to the aforementioned preferred embodiments, and the FFC (Flexibility Flat Cable) may be used as the connection member 4. Additionally, although the contact having the same shape is used in the first and second preferred embodiments, the contacts 3 that differ from each other in shape may be alternately disposed.

Although the present invention has been described in detail from the specific aspects, those skilled in the art who have understood the aforementioned content will easily recognize its modifications, variations, and equivalents. Therefore, the present invention should be within the scope of the claims and the scope of its equivalents.

REFERENCE SIGNS LIST

1: Connector
1Q: Connector
1R: Connector
2: Housing
3: Contact
3R: Contact
4: Connection member
4*e*: End
25*a*: Strike portion
26: Resinous elastic arm (insertion-resistance-giving member)
28: Projection
34: Elastic segmental portion
36: Inclined portion
36*a*: Top portion
37: Metallic elastic arm (insertion-resistance-giving member)
38: Projection
41: Insulation portion
41*a*: One surface
41*b*: Other surface
42: Conductive portion
43: Reinforcement plate
43*a*: Outer surface
65: Projection
A0: Insertion starting position
A1: First contact position
A2: Run-aground-operation completion position
A3: Second contact position
A4: Run-over-operation completion position
A5: Insertion completion position
C: Contact portion
K1: Early-term insertion interval
K2: Run-aground operation interval
K3: Middle-term insertion interval
K4: Run-over operation interval
K5: Late-term insertion interval
L: Longitudinal direction
LK1: Interval length
LK2: Interval length
LK3: Interval length
LK4: Interval length
LK5: Interval length
LWK: Interval length
P1: First peak value
P2: Second peak value
Pmax: Maximum value
S: Lateral direction
SS: Insertion recess portion
W: Width direction
W1: Width
W1C: Width center
W2: Width
W2C: Width center
WK: Entire interval
X1: Insertion direction
X2: Opposite direction

What is claimed is:

1. A connector to be connected to a flexible connection member, the connection member comprising: an insulation portion extending in a longitudinal direction; a plurality of conductive portions that are exposed in a predetermined range from an end in the longitudinal direction of the connection member on one surface of the insulation portion, that extend in the longitudinal direction, and that are arranged in parallel with each other in a lateral direction; and a reinforcement plate that is fixed to one other surface of the insulation portion in a predetermined range from the end in the longitudinal direction of the connection member and that is a flat surface in a whole area of an outer surface of the reinforcement plate, the connector comprising:

a housing made of resin that includes an insertion recess portion into which the connection member is insertable from the end of the connection member in an insertion direction along the longitudinal direction, the insertion recess portion including a strike portion to strike the end of the connection member at an insertion completion position of the end of the connection member;

a plurality of contacts each of which includes an elastic segmental portion held by the housing, the elastic segmental portion including an inclined portion that is inclined with respect to the insertion direction and a contact portion that is disposed at a top portion provided at an end portion in the insertion direction of the inclined portion and that is capable of coming into contact with a corresponding one of the conductive portions; and an elastically deformable insertion-resistance-giving member including a projection protruding from a side opposite to the contact portion into the insertion recess portion at a position away from the contact portion in a direction opposite to the insertion direction, and configured to give insertion resistance to the connection member through the projection, wherein a position of the projection is set so that, when the connection member is inserted into the insertion recess portion, the connection member is movable through a predetermined distance in the insertion direction until the end of the connection member comes into contact with a halfway portion of the inclined portion of the contact after the projection completes a run-aground operation in which the projection runs aground on the outer surface of the reinforcement plate in the end of the connection member, and wherein the insertion resistance received by the connection member is configured to generate a maximum value during the run-aground operation during a period of time during which the end of the connection member moves to the insertion completion position from an insertion starting position at which the end of the connection member starts insertion into the insertion recess portion.

2. The connector according to claim 1, wherein an entire interval from the insertion starting position to the insertion completion position through which the end of the connection member is movable includes:

an early-term insertion interval from the insertion starting position to a first contact position at which an end of the reinforcement plate comes into contact with the projection, a run-aground operation interval from the first contact position to a run-aground-operation completion position at which the projection completes the run-aground operation, a middle-term insertion interval from the run-aground-operation completion position to a second contact position at which the end of the connection member comes into contact with the halfway portion of the inclined portion of the contact, a run-over operation interval from the second contact position to a run-over-operation completion position at which a run-over operation is completed in which the end runs over the contact portion, and a late-term insertion interval from the run-over-operation completion position to the insertion completion position, wherein the insertion resistance received by the connection member during a period of time during which the end of the connection member moves from the insertion starting position to the insertion completion position is configured to generate a first peak value that is the maximum value in the run-aground operation interval, and is configured to generate a second peak value that is lower than the first peak value in the run-over operation interval, and wherein the insertion resistance received by the connection member during a period of time during which the end of the connection member moves through the middle-term insertion interval is configured to become lower than the second peak value.

3. The connector according to claim 2, wherein an interval length of the early-term insertion interval is longer than an interval length of the run-aground operation interval.

4. The connector according to claim 2, wherein a sum of an interval length of the run-aground operation interval, an interval length of the middle-term insertion interval, and an interval length of the run-over operation interval is equal to or less than an interval length of the late-term insertion interval.

5. The connector according to claim 2, wherein an interval length of the early-term insertion interval is not less than 20% and not more than 60% of an interval length of the entire interval.

6. The connector according to claim 1, wherein the insertion-resistance-giving member is a cantilevered resinous elastic arm that is formed integrally with the housing by a single member and whose front end has the projection.

7. The connector according to claim 6, wherein the resinous elastic arm includes a width center that is a center in the width direction, and a position of the width center of the resinous elastic arm is configured to coincide with a position of a width center in the lateral direction of the connection member when the connection member is inserted into the insertion recess portion, and a width of the resinous elastic arm is not less than 50% and not more than 70% of a width in the lateral direction of the connection member.

8. The connector according to claim 1, wherein the insertion-resistance-giving member includes a metallic elastic arm held by the housing.

9. The connector according to claim 8, wherein the metallic elastic arm includes a metallic elastic arm provided as a component that is structurally independent of the plurality of contacts.

10. The connector according to claim 8, wherein the plurality of contacts include a contact formed integrally with the metallic elastic arm by a single member.

* * * * *